United States Patent
McMaster et al.

(10) Patent No.: US 11,308,446 B1
(45) Date of Patent: *Apr. 19, 2022

(54) SYSTEMS AND METHODS FOR DYNAMIC BALANCING OF VIRTUAL BUNDLES

(71) Applicant: Coupang Corp., Seoul (KR)

(72) Inventors: Shuyun McMaster, Bothell, WA (US); Subrahmanya Pramod Nanduri, Sunnyvale, CA (US); Darin Miller, Sammamish, WA (US); Kenny Shi, Bellevue, WA (US)

(73) Assignee: Coupang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,215

(22) Filed: Mar. 31, 2021

Related U.S. Application Data

(63) Continuation of application No. 17/066,350, filed on Oct. 8, 2020, now Pat. No. 10,997,554.

(51) Int. Cl.
*G06Q 10/08* (2012.01)
*G06Q 30/06* (2012.01)
(Continued)

(52) U.S. Cl.
CPC ......... *G06Q 10/0875* (2013.01); *G06F 9/547* (2013.01); *G06F 16/2379* (2019.01); *G06F 16/285* (2019.01); *G06F 16/953* (2019.01); *G06K 7/10366* (2013.01); *G06K 7/1413* (2013.01); *G06Q 10/06315* (2013.01); *G06Q 30/0185* (2013.01); *G06Q 30/0635* (2013.01); *G06Q 30/0639* (2013.01)

(58) Field of Classification Search
CPC ............ G06F 11/3442; G06Q 10/6315; G06Q 30/201; G06Q 30/202; G06Q 10/875; G06Q 30/185
USPC .............. 705/7.25, 7.29, 7.31, 7.12; 235/375
See application file for complete search history.

(56) References Cited

U.S. PATENT DOCUMENTS

2003/0032218 A1   2/2003 Kado et al.
2004/0205003 A1  10/2004 Carpenter et al.
(Continued)

OTHER PUBLICATIONS

Notification of Transmittal of International Search Report and the Written Opinion of the International Searching Authority, or the Declaration for corresponding International Application No. PCT/IB2020/059576, filed Oct. 12, 2020, dated Jul. 5, 2021 (10 pgs.).
(Continued)

*Primary Examiner* — Edwyn Labaze
(74) *Attorney, Agent, or Firm* — Finnegan, Henderson, Farabow, Garrett & Dunner LLP

(57) ABSTRACT

A computer-implemented system for dynamic inventory balancing including at a processor and a memory device comprising instructions that when executed configure the processor to perform operations. The operations including receiving an inventory data feed from at least one fulfillment center, storing (in a database) a plurality of virtual bundles with associated grouping numbers and quantities—the plurality of virtual bundles having item bundles grouping two or more of a same item in the inventory data. The operations also include exposing the database to queries from a seller portal through at least one of RESTful service, a queue based system, an index, or an object table and receiving a client order, the client order comprising a bundle selection from the plurality of virtual bundles, and updating the plurality of virtual bundles by rebalancing the plurality of virtual bundles and corresponding associated quantities based on the bundle selection.

20 Claims, 26 Drawing Sheets

(51) Int. Cl.
*G06Q 30/00* (2012.01)
*G06Q 10/06* (2012.01)
*G06K 7/14* (2006.01)
*G06K 7/10* (2006.01)
*G06F 16/28* (2019.01)
*G06F 9/54* (2006.01)
*G06F 16/953* (2019.01)
*G06F 16/23* (2019.01)

(56) References Cited

U.S. PATENT DOCUMENTS

2012/0130856 A1* 5/2012 Petri .................. G06Q 30/0623
705/26.61
2014/0279294 A1 9/2014 Field-Darragh et al.
2016/0171439 A1 6/2016 Ladden et al.
2017/0364852 A1 12/2017 Grabovski et al.
2020/0082331 A1 3/2020 Kaufmann et al.

OTHER PUBLICATIONS

Tang, P., & Sandholm, T. (Jun. 2012). Mixed-bundling auctions with reserve prices. In AAMAS (pp. 729-736).
Grigoriev, A., Van Loon, J., Sviridenko, M., Uetz, M., & Vredeveld, T. (Oct. 2007). Bundle pricing with comparable items. In European Symposium on Algorithms (pp. 475-486). Springer, Berlin, Heidelberg.
Balcan, M. F., & Blum, A. (Jun. 2006). Approximation algorithms and online mechanisms for item pricing. In Proceedings of the 7th ACM Conference on Electronic Commerce (pp. 29-35).
Zhang, Y., Chin, F. Y., & Ting, H. F. (2014). Online pricing forbundies of multiple items. Journal of Global Optimization, 58(2), 377-387.

* cited by examiner

| | id | virtual_vid | Bundle CAT | sku | price_ratio | Bundle quantity | status | Bundle merger | seller_product_id | upload_id | vb_sku_code |
|---|---|---|---|---|---|---|---|---|---|---|---|
| 1 | 23 | A1 | B1 | DaV-6120 | 1 | 2 | ACTIVE | [NULL] | qwe | iop | bnm |
| 2 | 24 | A2 | B2 | DaV-6120 | 1 | 4 | ACTIVE | asd | [NULL] | [NULL] | [NULL] |
| 3 | 25 | A3 | B3 | NOW-07625 | 1 | 2 | INACTIVE | asd | [NULL] | [NULL] | [NULL] |
| 4 | 26 | A4 | B4 | CWN-01966 | 1 | 2 | ACTIVE | [NULL] | qwe | iop | bnm |
| 5 | 27 | A5 | B5 | CRA-01117 | 1 | 3 | INACTIVE | asd | [NULL] | [NULL] | [NULL] |
| 6 | 28 | A6 | B6 | CRA-95019 | 0.8 | 3 | ACTIVE | [NULL] | [NULL] | [NULL] | [NULL] |
| 7 | 29 | A7 | B7 | CRA-01133 | 1 | 3 | ACTIVE | asd | [NULL] | [NULL] | [NULL] |
| 8 | 30 | A8 | B8 | CRA-00628 | 1 | 2 | ACTIVE | [NULL] | qwe | iop | bnm |
| 9 | 31 | A9 | B9 | CCY-07113 | 0.9 | 3 | ACTIVE | [NULL] | [NULL] | [NULL] | [NULL] |
| 10 | 32 | A10 | B10 | CCY-07111 | 1 | 3 | INACTIVE | [NULL] | [NULL] | [NULL] | [NULL] |
| 11 | 33 | A11 | B11 | TAH-30032 | 1 | 2 | INACTIVE | asd | [NULL] | [NULL] | [NULL] |
| 12 | 34 | A12 | B12 | TAH-30032 | 1 | 4 | ACTIVE | [NULL] | qwe | iop | bnm |
| 13 | 35 | A13 | B13 | ETB-21100 | 1 | 3 | ACTIVE | [NULL] | [NULL] | [NULL] | [NULL] |
| 14 | 36 | A14 | B14 | ETB-21100 | 0.5 | 4 | ACTIVE | asd | [NULL] | [NULL] | [NULL] |
| 15 | 37 | A15 | B15 | CRA-03695 | 1 | 3 | INACTIVE | [NULL] | [NULL] | [NULL] | [NULL] |
| 16 | 38 | A16 | B16 | CRA-94502 | 1 | 3 | ACTIVE | asd | [NULL] | [NULL] | [NULL] |
| 17 | 39 | A17 | B17 | CRA-95025 | 0.25 | 5 | ACTIVE | [NULL] | qwe | iop | bnm |

FIG. 12

SYSTEMS AND METHODS FOR DYNAMIC BALANCING OF VIRTUAL BUNDLES

CROSS-REFERENCE TO RELATED APPLICATIONS

This application is a continuation of application Ser. No. 17/066,350, filed Oct. 8, 2020, the disclosure of which is expressly incorporated herein by reference in its entirety.

TECHNICAL FIELD

The present disclosure generally relates to computerized systems and methods for dynamic inventory management. In particular, embodiments of the present disclosure relate to inventory management systems that categorize groups of items using virtual bundles and dynamically adapt the virtual bundles to maximize inventory diversity and range of available offers.

BACKGROUND

Real-time inventory management systems automatically record orders and purchases to update databases and give companies and/or sellers a complete picture of demand, available inventory, and required repurchases. Real-time inventory management systems are particularly important for online sellers because the inventory management systems provide critical information to forecast client demand and identify supply chain needs. Indeed, to achieve higher precision, real-time inventory management systems frequently use RFID (radio frequency identification) technologies—or bar code systems—in order to record new receipts and sales more quickly with little human intervention. Deployment of these systems allow automated recording of every transaction (both purchases of new stock as well as outbound orders and all of the associated costs) in real-time to provide an accurate inventory status.

Real-time inventory management, however, is difficult to achieve in complex online retail operations that use broad warehouse networks, multiple vendors, and/or customized product listings-which may depend on regions, seasons, or customer preferences. Further, configuring and maintaining inventory management systems has turned cumbersome with the increased complexity of fulfillment center (FC) networks, the use of third-party vendors, and increased personalization of marketing campaigns. For example, products that are offered in a website may be held in different FCs and/or be sourced from third-party vendors. Thus, inventory management systems need to coordinate multiple systems to create an accurate representation of the network's inventory. Further, FCs may store products from multiple vendors with independent inventory systems, different item identification, and/or customized product categorization. Thus, inventory management systems may have to reconcile inventory data.

Such complexity of FCs networks, multiple vendors, customized product listings, and variety of inventory systems results in inventory update delays that prevent real-time inventory management. For example, in order to coordinate inventory between multiple FCs, inventory systems usually update inventory in cycles (e.g., once a day). But inventory updates with such long cycles cause issues at both the front end and the back end of online retail operations. For example, lack of real-time inventory data result in problems of offering unavailable products to customers. Further, lack of accurate inventory data may result in supply chain discontinuity.

The disclosed computerized systems and methods of dynamic balancing of virtual bundles address one or more of the problems set forth above and/or other problems in the prior art.

SUMMARY

One aspect of the present disclosure is directed to a system for dynamic inventory balancing. The system may include at least one processor and at least one memory device comprising instructions that when executed configure the at least one processor to perform operations. The operations may include receiving an inventory data feed from at least one fulfillment center, storing (in a database) a plurality of virtual bundles with associated grouping numbers and quantities—where the plurality of virtual bundles include item bundles grouping two or more of a same item in the inventory data. The operations may also include exposing the database to queries from a seller portal through at least one of RESTful service, a queue based system, an index, or an object table, and receiving (from the seller portal) a client order, the client order comprising a bundle selection from the plurality of virtual bundles. The operations may also include, in response to receiving the client order, updating the plurality of virtual bundles by rebalancing the plurality of virtual bundles and corresponding associated quantities based on the bundle selection.

Another aspect of the present disclosure is directed to a computer-implemented method for dynamic inventory balancing. The method may include receiving an inventory data feed from at least one fulfillment center, storing (in a database) a plurality of virtual bundles with associated grouping numbers and quantities—where the plurality of virtual bundles include item bundles grouping two or more of a same item in the inventory data. The method may also include exposing the database to queries from a seller portal through at least one of RESTful service, a queue based system, an index, or an object table, and receiving (from the seller portal) a client order, the client order comprising a bundle selection from the plurality of virtual bundles. The method may also include, in response to receiving the client order, updating the plurality of virtual bundles by rebalancing the plurality of virtual bundles and corresponding associated quantities based on the bundle selection.

Yet another aspect of the present disclosure is directed to an apparatus including one or more processors and one or more memory devices with instructions that when executed configure the one or more processors to: receive an inventory data feed from at least one fulfillment center, store (in a database) a plurality of virtual bundles with associated grouping numbers and quantities. The plurality of virtual bundles including item bundles grouping two or more of a same item in the inventory data by: generating a plurality of encoded tags, each of the encoded tags encoding an item ID and a bundle group and generating a record in the database for each item in the inventory data and each of the plurality of bundles—each data record comprising an encoded tag field and a quantity field. The instructions may also configure the processors to expose the database to queries from a seller portal through a RESTful service, receive (from the seller portal) a client order, the client order comprising a bundle selection from the plurality of virtual bundles, and, in response to receiving the client order, update the plurality of virtual bundles by: determining an updated item inventory based on the bundle selection, rebalancing the plurality of virtual bundles through sequential assignment of items maximizing bundle diversity, and updating the database to modify an item inventory. Moreover, the instructions may also configure the processors to receive updated inventory data from the at least one fulfillment center and rebalance the plurality of bundles in the database based on the updated inventory data.

Other systems, methods, and computer-readable media are also discussed herein.

BRIEF DESCRIPTION OF THE DRAWINGS

FIG. 12 is an exemplary table in a database storing virtual bundle information, consistent with disclosed embodiments.

DETAILED DESCRIPTION

Figure 1A:
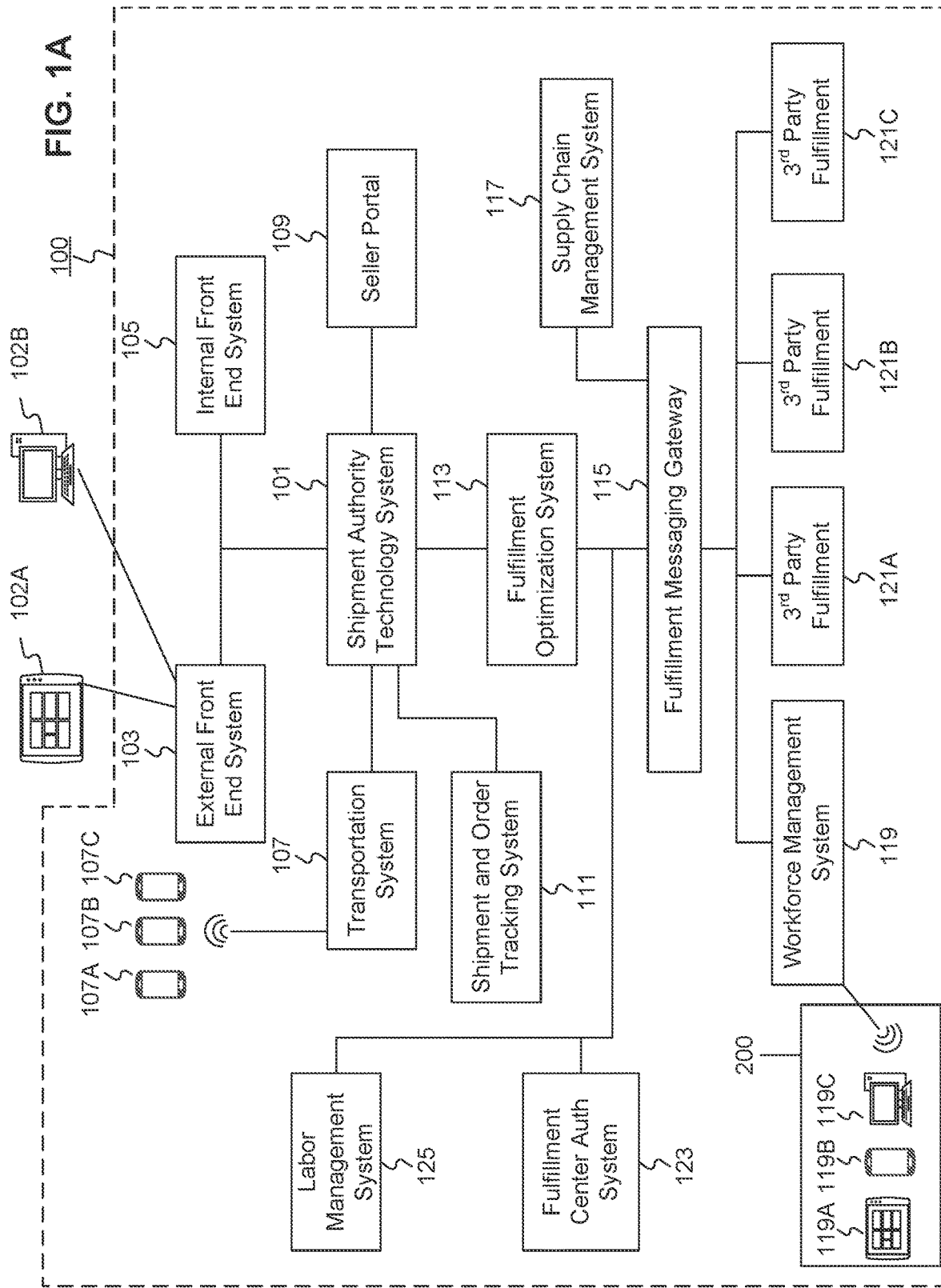
FIG. 1A is a schematic block diagram illustrating an exemplary embodiment of a network including computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for dynamic inventory balancing and automated management/rebalancing of virtual bundles. Virtual bundles, in some embodiments, may be virtual or digital groups of items that are organized in bundles to offer customized pricing. One or more items may be bundled in different virtual bundles that group 2, 3, 4, and 5 of the item or that group multiple related items. For example, bananas may be grouped in bundles of 2, 3, 4, 5, . . . 10 bananas. Alternatively, bread may be bundled with peanut butter. The virtual bundle of 2 items may have a price of $1 (for $0.50/item) while the virtual bundle of 4 items may have a price of $1.6 (for $0.40/item). Further, bundled items may have a lower price than the individual items. Thus, the virtual bundles have an associated grouping number or bundle quantity (i.e., the number of items in the bundle), an associated bundle price (i.e., the price for the bundled items), and an associated per item price (i.e., the price for each item in the bundle). Such organization of inventory allows retailers to customize or tailor pricing based on bundle quantities or combinations. For example, in some embodiments as the grouping number increases in virtual bundles, the per item price may decrease, to incentivize bulk purchases. Disclosed systems and methods may improve the technical field of real-time inventory management by enabling dynamic balancing across virtual bundles for real-time inventory updates and customized listings based on inventory data feeds, customer orders, and/or machine-learning (ML) models.

Some embodiments of the disclosed systems and methods may improve the field of automated inventory management by employing a balancing system/service that interfaces clients and FCs to maintain a balanced bundled inventory in real-time. Instead of relying on warehouse or FC inventory data feeds to generate virtual bundles, the disclosed systems and methods may use customer orders and forecasting ML models to manage inventory information and improve inventory accuracy. For example, some embodiments of the disclosed systems and methods may allow to automatically modify websites based on inventory estimated based on customer orders to prevent false out-of-stock (OOS) listings in a website. In some embodiments, disclosed systems and methods may constantly update item bundling by rebalancing the allocation of items to different bundles as soon as fulfillment systems receive the client orders. Such embodiments improve the technical field of automated inventory management by allowing rebalancing of virtual bundles without required communication from inventory data feeds or update cycles from warehouses and FCs. Such embodiments may also improve the generation of retailer websites by providing a database with real-time information of aggregated items for bundled products that facilitate production of customized item listings in websites.

Moreover, the disclosed systems and methods may also reduce network congestion in online seller's networks when updating inventory or refreshing websites. For example, some of the disclosed systems and methods may minimize communications between warehouses (or FCs) and global inventory systems by calculating available inventory in real-time based on customer orders—without pinging or querying inventory systems at the FCs. Estimating inventory (e.g., through rebalancing of virtual bundles) allows the calculation of available inventory in a network locally and in real-time while avoiding frequent and heavy communication exchanges with multiple FCs in the network. Thus, the disclosed systems and methods may reduce congestion in online retailers' networks by controlling inventory updates based on rebalances triggered by customer orders, without having to query FCs.

The disclosed systems and methods may also improve the generation of seller websites or portals by providing fast and programmable services that provide updated inventory information. For example, some of the disclosed system and methods may allow the configuration of centralized REST and/or queue services that provide updated inventory to both seller portals and fulfillment systems. These services can allow seller portals and/or inventory system to query inventory databases on demand without needing to wait for FC or warehouse managed inventory updates. Thus, disclosed systems and methods may enable faster and more accurate generation of bundled product listings in retailer websites. Such embodiments improve the field of generating eCommerce websites by providing more accurate information that allows the generation of customized product listings.

Furthermore, disclosed systems and methods may also improve the field of customizing websites based on customer demands by allowing inventory systems to adapt bundle product listings based on forecasted demand. For example, certain embodiments of the disclosed systems and methods allow to identify products and bundles in high demand in real-time by monitoring purchases and customer behavior. In some embodiments, the disclosed systems and methods may include employing ML algorithms to predict demand for bundled items based on previous orders. The disclosed systems and methods may employ rebalancing operations and ML models to respond to client demand for specific products and bundles and maximize customer retention. For instance, disclosed systems and methods may identify and/or forecast increased demand for a bundled product with a specific bundle quantity and automatically rebalance available inventory in real-time to minimize out-of-order errors for clients and maximize client retention.

Reference will now be made in detail to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

Further, in some embodiments SAT system 101 may be in communication and control item positioning systems that track and/or store products that are warehoused in the FC. For example, SAT system 101 may control systems that track the position of products multiple virtual locations of the FC, as further described in connection to FIG. 14.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

In some embodiments FO systems 113 may also be in communication with product position systems of FCs. In such embodiments, FO systems 113 may have precise information of the product, tentative delivery dates, available delivery options, and cutoff times for each one of the delivery options.

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. Further, the information could include the location of the product within the FC and estimated required time for shipping and delivery. This could include, for example, shelf or pallet position, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front-end system 103.

Figure 1D:
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart.

In some embodiments, external front-end system 103 may be further configured to enable sellers to transmit and receive information relating to orders. For example, external front-end system 103 may allow sellers to transmit estimated packing time and/or available delivery options for specific products.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems. In some embodiments, internal front-end system 105 may be configured to direct workers for an FC to place items in specific locations. For instance, in some embodiments, SAT system 101 may be configured to perform predictive algorithms to identify the products that have a greater likelihood to be requested with a special delivery option. For example, SAT system 101 may be configured to identify the products that are most likely to be requested for dawn delivery or for first time delivery. In such embodiments, internal front-end system 105 may be in communication with SAT system 101 and produce websites and/or user interfaces for workers that guide product placement within the FC with the objective of improving delivery times and maximizing the number of products available for dawn, fresh, or first time delivery.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding cutoff time (maximum time for a specific delivery time) and/or PDD (promised delivery date) for each product. The cutoff time and PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like. Further, FO system 113 may calculate a cutoff time based on past deliveries, physical distance between the product location and the shipping center, and available personnel at the location of the FC, among others.

In some embodiments, FO system 113 may determine cutoff times and PDDs for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD or cutoff time on demand. In yet other embodiments, FO system 113 may determine PDD and cutoff times as a use navigates through one of the websites. Processes for calculation and transmission of PDD or cutoff times by FO system 113 are further described in connection to FIG. 7.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package or that a sensor of the positioning systems has been triggered. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners. RFID readers, high-speed cameras, devices such as tablet 119A, mobile device/PDA 119B, computer 119C, or the like). Alternatively, a wireless sensor may determine a product has been taken into or out of the shelf. WMS 119 may store each event indicating a scan, a read of a package identifier, or a sensor event in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. Further, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123. WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
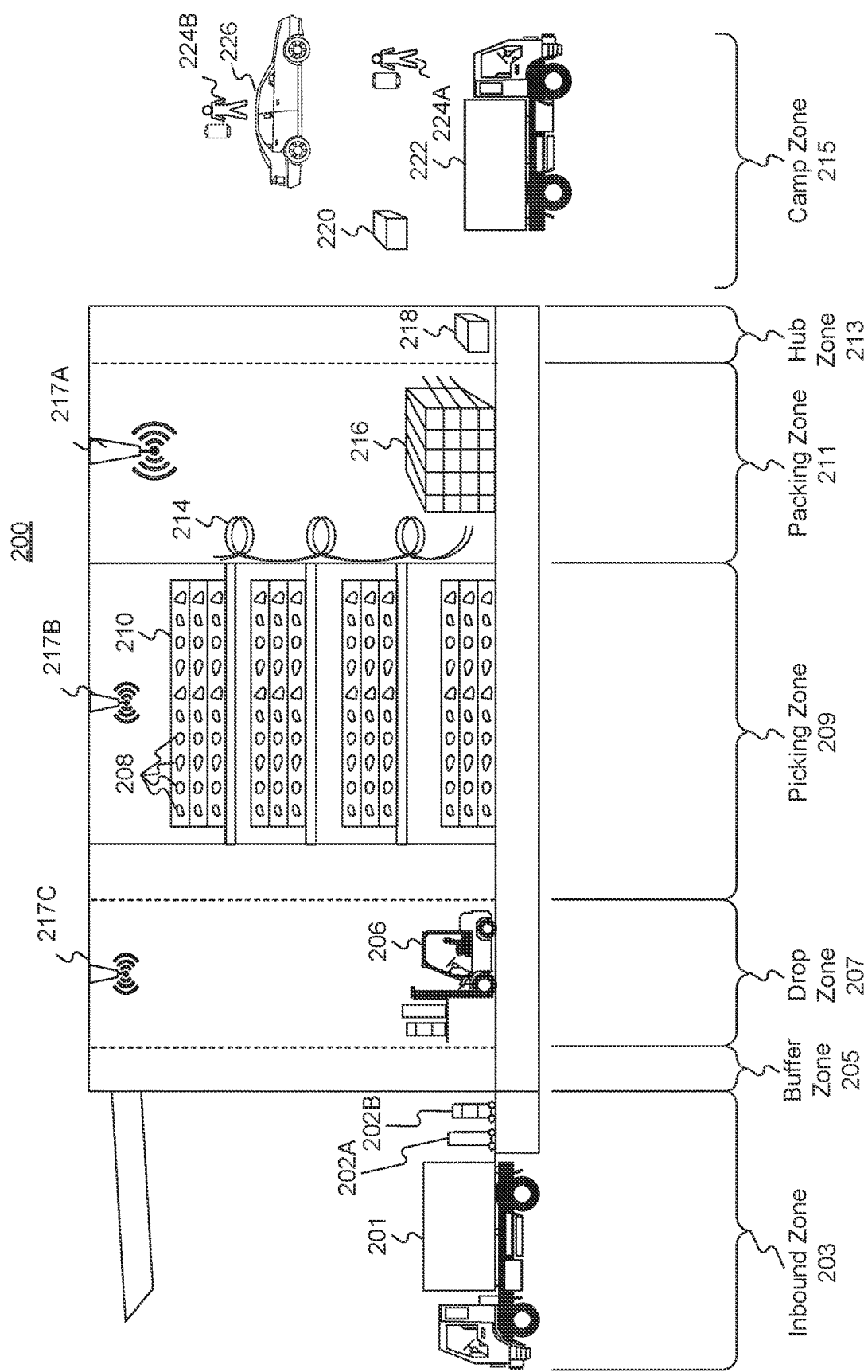
FIG. 2 is a diagrammatic illustration of an exemplary fulfillment center configured to utilize disclosed computerized systems, consistent with the disclosed embodiments.

FIG. 2 depicts a fulfillment center 200. Fulfillment center (FC) 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). Such event may update a real time location system that updates a database to specify the item has been moved into the FC. The picker may then take the item to picking zone 209 (e.g., by placing it on a cart or carrying it) and the real time location system may request the position of storage for the new item.

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. In some embodiments, the location to stow item 202A may be determined based on predictive algorithms that attempt to maximize the availability of special delivery options, such as dawn deliveries. The device may then prompt the picker to scan a barcode at that location before stowing item 202A in that location. Alternatively, a wireless sensor or a camera coupled with image recognition, may store the location of the time. In some embodiments, the device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. In some embodiments, as further described in connection with FIG. 11, the picker may receive instructions through a placement or storing guide to stow the products. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213. e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, a delivery option, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

In some embodiments, as shown in FIG. 2, one or more of the sections of FC 200 may include a positioning system 217. Positioning system 217 may include a plurality of sensors that may be used to determine the position of products within the FC and track their movement through the FC. In such embodiments, sensors of positioning system 217 may be used for both, tracking the position of products in the FC and also estimating movement between different sections. For instance, sensors of positioning system 217 may be used to store historic data of time elapsed between the different regions of FC 200. This information may then be used for determining distances or estimated times between storing zones and packing zones.

As shown in FIG. 2 the positioning system 217 may include sensors 217A in packing zone 211, sensors 217B in picking zone 209, and sensors 217C in drop zone 205. However, more sensors may be placed in different regions of FC 200 with the goal of tracking and capturing the position of items FC 200 and improve the accuracy of estimated deliveries or maximize the availability of delivery options.

Figure 3:
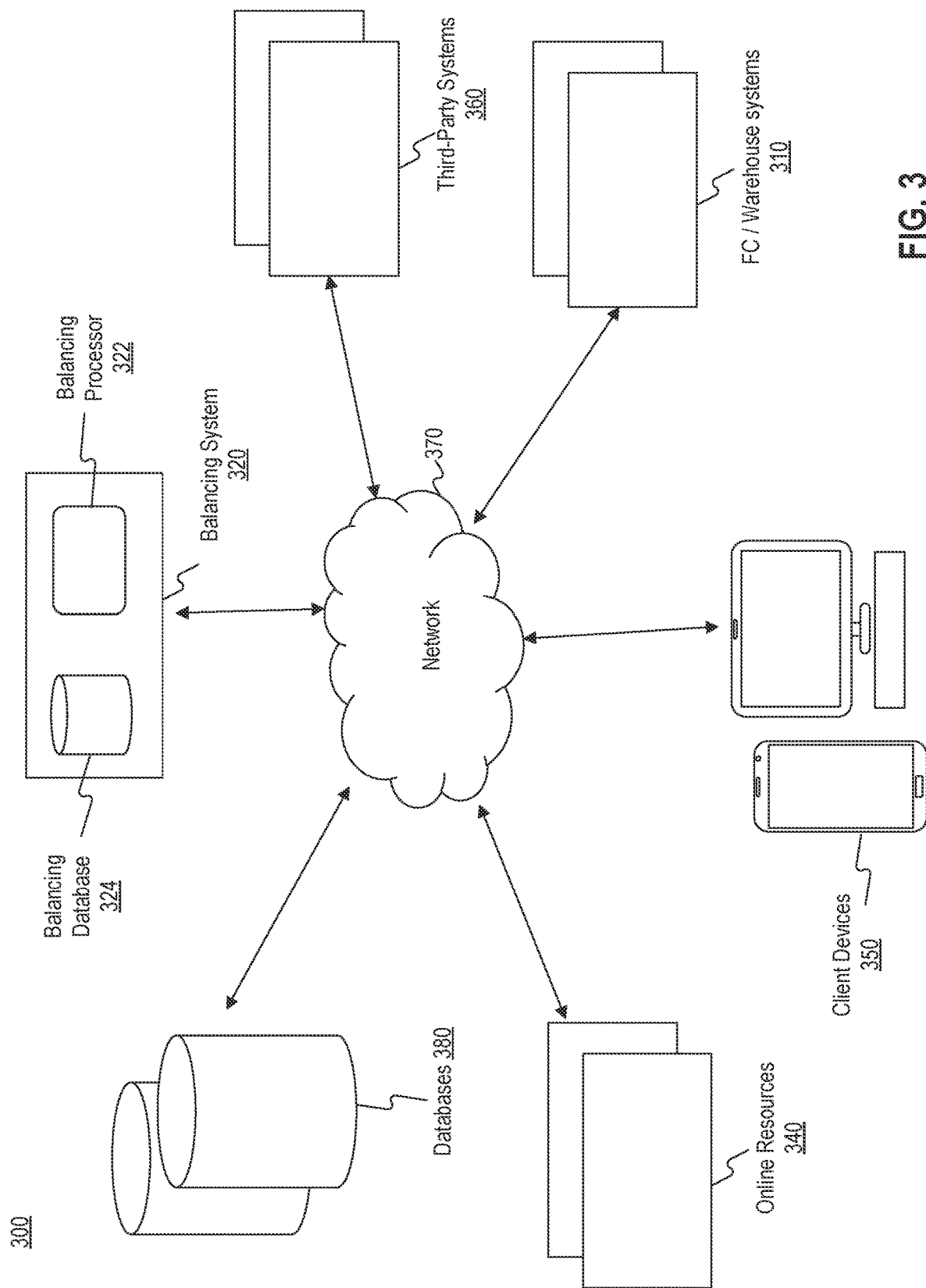
FIG. 3 is a schematic block diagram of an exemplary system, consistent with disclosed embodiments.

FIG. 3 is a block diagram of an exemplary system 300, consistent with disclosed embodiments. In system 30) a balancing system 320 may process inventory data feeds and client purchases in real-time to, for example, determine available inventory and balance virtual bundles. System 300 may include balancing system 320, online resources 340, client devices 350, third-party systems 360. FC/Warehouse systems 310, and database 380. In some embodiments, as shown in FIG. 3, components of system 300 may be connected to a network 370. However, in other embodiments components of system 300 may be connected directly with each other, without network 370. For example, database 380 may be directly coupled to balancing system 320.

In some embodiments, balancing system 320 may be implemented with one or more of the components of system 100 (FIG. 1A). For example, balancing system 320 may include SAT system 101, external front-end system 103, FO system 113, SCM system 117, and/or WMS 119 (FIG. 1A). In other embodiments, balancing system 320 may be implemented with one or more independent servers configured to perform operations for collecting inventory data from warehouses (such as FC/warehouse systems 310), client orders (e.g., from client devices 350), and third-party orders (e.g., from third-party systems 360) and estimate available inventory to balance virtual bundles and provide information for external systems to generate seller portals that can be displayed in client devices 350.

Balancing system 320 may include a balancing database 324 and a balancing processor 322. Balancing database 324 may be implemented with any storage systems or devices configured to store available items and manage grouping of items for virtual bundles. Balancing processor 322 may include any processing device, such as a CPU. GPU, and/or FPGA configured to process information from other elements in system 300 and update inventory data in balancing database 324 and/or the arrangement of virtual bundles. Moreover, in some embodiments balancing processor 322 may be configured to generate scripts or instructions for generating or modifying websites in client devices. For example, in some embodiments balancing processor 322 may be configured to generate website updates or refreshes anytime there is an update in virtual bundles or overall inventory in balancing database 324. Balancing system 320, balancing database 324, and balancing processor 322 are further discussed in connection with FIG. 6.

Online resources 340 may include one or more servers or storage services provided by an entity such as a provider of website hosting, networking, cloud, or backup services. In some embodiments, online resources 340 may be associated with hosting services or servers that store web pages for authentication services. Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to display graphical user interfaces in websites that include product listings arranged in one or more bundles and describing bundle quantity, bundle price, and/or per unit price, based on information of balancing system 320. For example, in some embodiments client devices 350 may generate graphical user interfaces like the ones described in connection to FIG. 19 based on information received from balancing system 320. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

Figure 4:
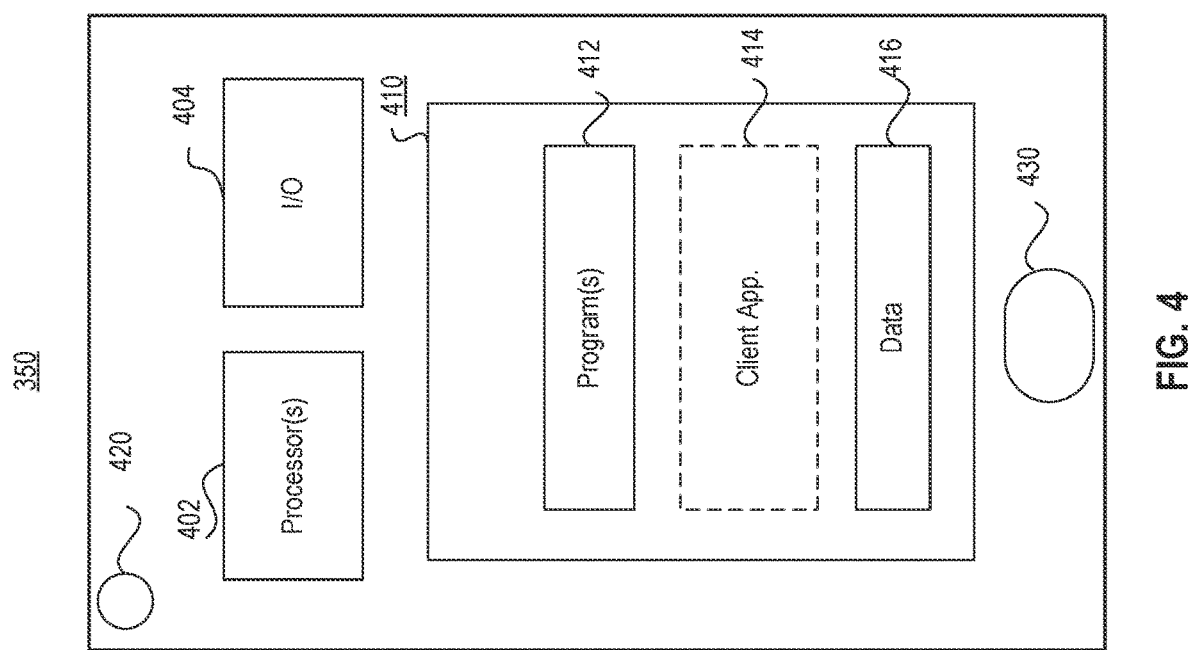
FIG. 4 is a block diagram of an exemplary client device, consistent with disclosed embodiments.

In some embodiments, as further disclosed in connection to FIG. 4, client devices 350 may run applications specifically configured to interact with balancing system 320. Moreover, client devices 350 may store one or more accounts. For example, client devices 350 may store information about a customer's delivery preferences, the customer's location, customer account, and customer identification.

The disclosed embodiments are not limited to any particular configuration of client devices 350. For instance, a client device 350 may be a mobile device that stores and executes mobile applications to perform operations that provide functions offered by balancing system 320 and/or online resources 340. Client devices 350 are further described in connection with FIG. 4.

Database 380 may include one or more computing devices configured with appropriate software to perform operations consistent with providing balancing system 320 data for determining available inventory and generate virtual bundles. Database 380 may include, for example, Oracle™ databases, Sybase™ databases, or other relational databases or non-relational databases, such as Hadoop™ sequence files, HBase™, or Cassandra™. Database 380 may include computing components (e.g., database management system, database server, etc.) configured to receive and process requests for data stored in memory devices of the database(s) and to provide data from the database(s).

While database 380 are shown separately, in some embodiments database 380 may be included in, or otherwise related to balancing system 320 or online resources 340.

Database 380 may be configured to collect and/or maintain data associated with user accounts or products to facilitate determination of available inventory and the determination of virtual bundles. For example, database 380 may store information about inventory from FCs, aggregated inventory, and/or real-time information of virtual bundles. Database 380 may also store data structures that specify the pricing of virtual bundles, forecasted demand, and price adjustments. Database 380 may also store other information about the location of items and rules for bundling items in different locations. Moreover, database 380 may store information to normalize inventory data from multiple systems. For example, database 380 may collect the data from a variety of sources, including, for instance, online resources 340 or third-party systems 360, and normalize information to aggregate inventory data that is then arranged in virtual bundles. Further, database 380 may include information about client devices 350 operating systems. Database 380 are further described below in connection with FIG. 5.

In some embodiments, third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to balancing system 320, such as a provider of services or a fulfillment center. Third-party systems 360 may also be connected to system 300 via network 370, but in other embodiments third-party systems 360 may include direct connections with some elements of system 300. For example, to minimize delays or network congestion third-party systems 360 may be connected in a private network with balancing system 320. Further, third-party systems 360 may be configured to provide and/or request information from balancing system 320, or other elements of system 300. In some embodiments, while third-party systems 360 may also be coupled to network 370, they may not be clients of balancing system 320. Instead, third-party systems 360 may include systems that include information of users or clients of balancing system 320. Further, if a product is not available within fulfillment centers in system 100 (FIG. 1A), third-party systems 360 may perform their own calculations and inform balancing system 320 about the available inventory and tentative bundling rules to create virtual bundles with customized pricing.

FC/Warehouse systems 310 may include sensors and processors for determining and/or storing the location of products within an FC or warehouse. For example, FC/Warehouse systems 310 may include sensors 217A-217C (FIG. 2). Alternatively, or additionally, FC/Warehouse systems 310 may include cameras that capture images of shelves and use image recognition methods to identify products and determine the position of products in the FC. Further, FC/Warehouse systems 310 may be coupled to scan devices and track the positioning of products in an FC by monitoring scanning events of products. Moreover, FC/Warehouse systems 310 may be in communication with balancing system 320 to provide information that facilitates estimating available inventory and balancing of virtual bundles for more accurate listings and demand forecasts. In some embodiments, FC/Warehouse systems 310 may be configured to provide periodic updates of available inventory to balancing system 320. For example, FC/Warehouse systems 310 may be configured to send available inventory to balancing system 320 at the end of every day. Alternatively, or additionally, balancing system 320 may be coupled to FC/Warehouse systems 310 through data feeds that enable real-time inventory updates and real-time virtual bundle rebalancing based on the available inventory.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit, and the like based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with balancing system 320 and/or generate product information requests. In addition, client applications 414 may interpret instructions for generating graphical user interfaces (GUI) in client devices 350 or modifying displayed GUI. Memory 410 may also store data 416 that may be used by balancing system 320 to rebalance virtual bundles and/or forecast customer demand.

In certain embodiments, memory 410 may store instructions for accessing or sending requests to balancing system 320. For example, memory 410 may include an application that communicates with balancing system 320 via TCP/IP. Moreover, other software components may be configured to request information from balancing system 320 or determine the location of client devices 350. For instance, these software instructions, when executed by processor(s) 402, may process information to display bundle selection, available pricing, and remaining inventory for a website, as discussed in connection with FIG. 19. The software instructions may also implement scripts to modify websites being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with balancing system 320.

In some embodiments, client devices 350 may also include a camera 420 that capture images and may be used for identification of a product that the user wants. Such identification may trigger queries to database 380 or balancing system 320 to retrieve available virtual bundle information for display in client devices 350. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
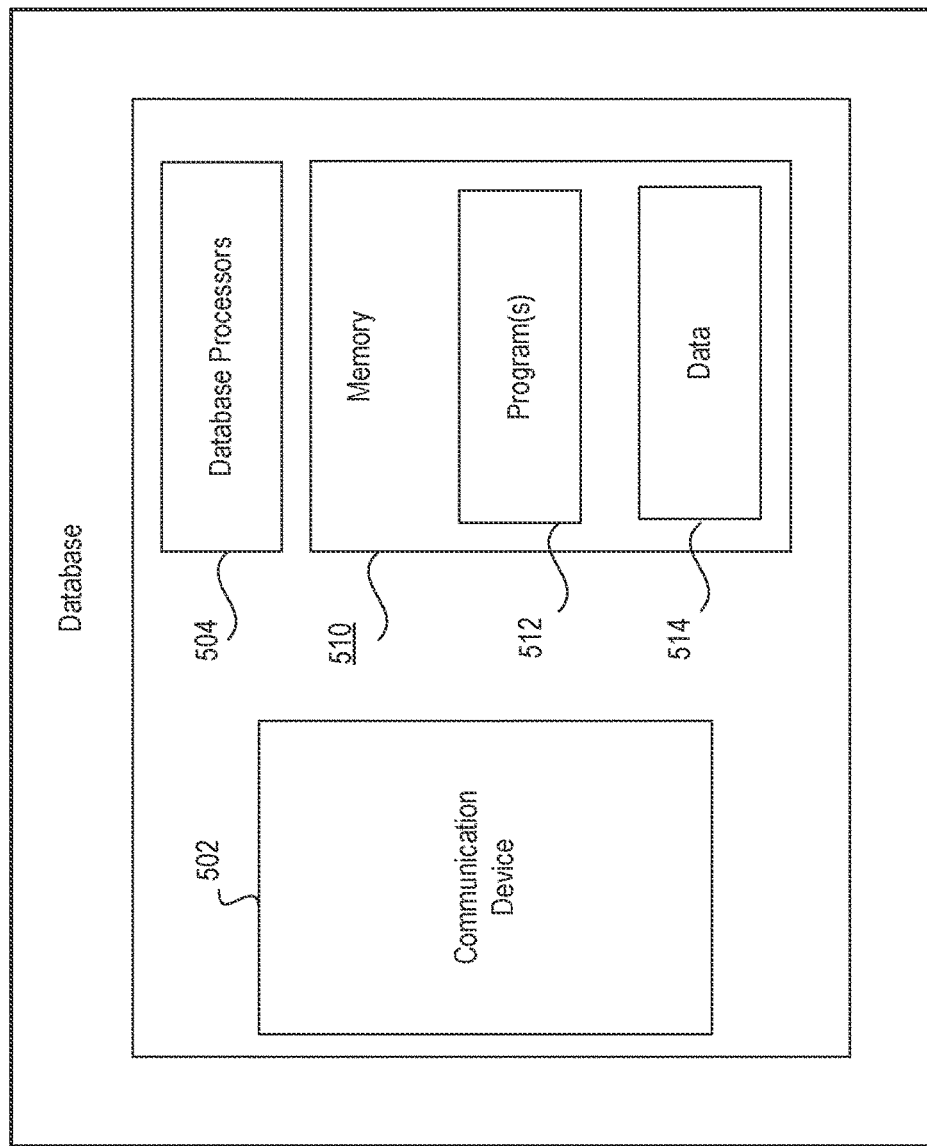
FIG. 5 is a block diagram of an exemplary database, consistent with disclosed embodiments.

Referring now to FIG. 5, there is shown a block diagram of an exemplary database 380 (FIG. 3), consistent with disclosed embodiments. In some embodiments, database

380 may be included in elements of system 100. For example, database 380 may be part of the FO system 113 or the WMS 119 (FIG. 1A).

Database 380 may include a communication device 502, one or more database processors 504, and database memory 510 including one or more database programs 512 and data 514. Database 380 may include NoSQL databases such as HBase, MongoDB™ or Cassandra™. Alternatively, database 380 may include relational databases such as Oracle, MySQL and Microsoft SQL Server.

In some embodiments, database 380 may take the form of servers, general purpose computers, mainframe computers, or any combination of these components. In some embodiments, database 380 are included within other elements of system 300, such as balancing system 320. Other implementations consistent with disclosed embodiments are possible as well.

In some embodiments, database 380 may include both non-relational and embedded databases. For example, database 380 may include a non-relational database, such as an Hbase, and an embedded database, such as a RocksDB (e.g., a key-value store database).

Communication device 502 may be configured to communicate with one or more components of system 300 or system 100, such as online resources 340, balancing system 320, or SCM system 117. In particular, communication device 502 may be configured to provide balancing system 320 order information, user preferences and privileges, position of products within the FC, and/or historic previous estimations for similar postal codes and products inquiries.

The components of database 380 may be implemented in hardware, software, or a combination of both hardware and software. For example, although one or more components of database 380 may be implemented as computer processing instruction modules, all or a portion of the functionality of database 380 may be implemented instead in dedicated electronics hardware.

Database memory 510 may include programs 512, which may include instructions to update websites based on available inventory, rebalanced virtual bundles, and/or price changes as determined by balancing system 320. Further, database memory 510 may include instructions for communications between elements of system 300. For example, database memory 510 may include instructions for communications between client devices 350 and balancing system 320. Further programs 512 may include instructions to store information in real-time as it is processed by balancing system 320.

Data 514 may also be data associated with websites, such as online resources 340, or user accounts from client devices 350. Data 514 may include, for example, information relating to previous delivery estimation calculations, available delivery options for products in an FC, or previous virtual bundles associated with an item. Data 314 may also include content files and accumulation variables to evaluate capacity of fulfillment centers and order availability.

Figure 6:
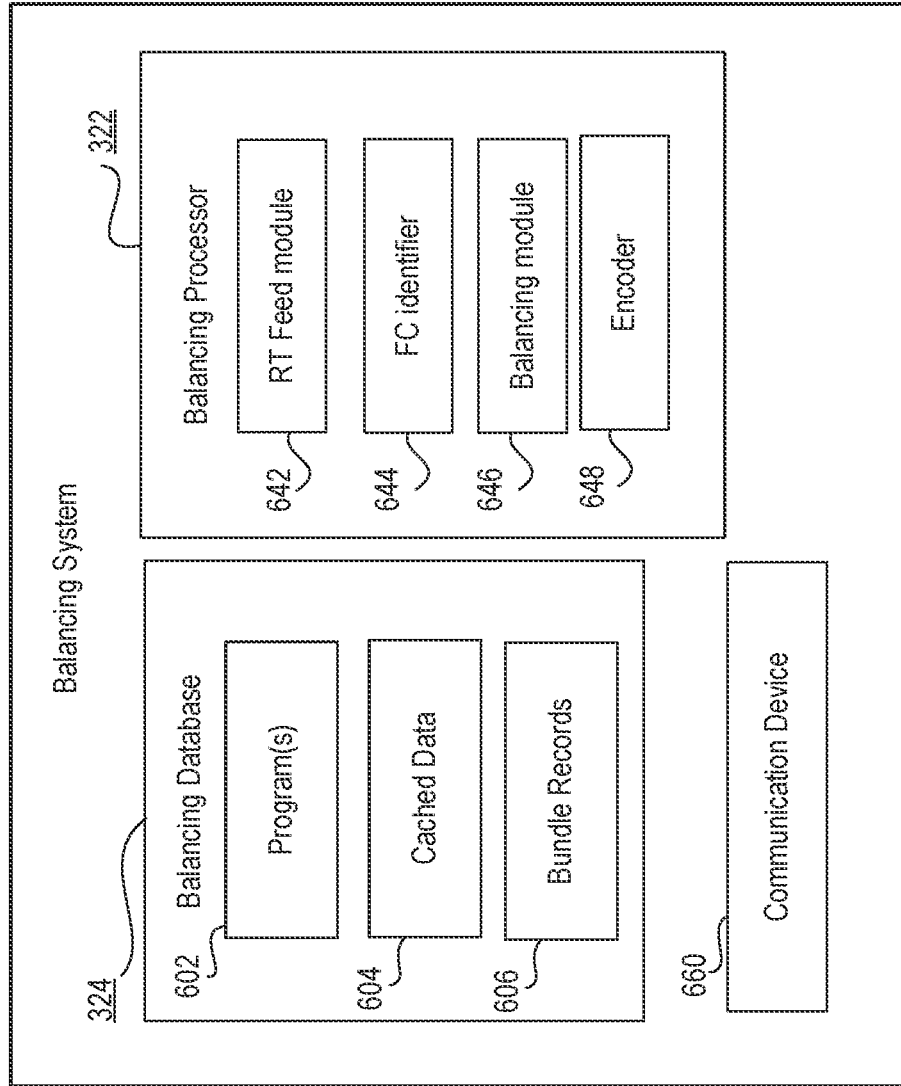
FIG. 6 is a block diagram of an exemplary balancing system, consistent with disclosed embodiments.

FIG. 6 is a block diagram of an exemplary balancing system 320, consistent with disclosed embodiments, balancing system 320 may include a communication device 660, balancing database 324, and one or more balancing processors 322. Balancing database 324 may include balancing programs 602, cached data 604, and bundle records 606. Balancing processors 322 include a real-time (RT) feed module 342, an FC identifier 644, a balancing module 646, and an encoder 348.

In some embodiments, balancing system 320 may take the form of a server, a general-purpose computer, a mainframe computer, or any combination of these components. In other embodiments, balancing system 320 may be a virtual machine. In yet other embodiments, operations and functions described for balancing system 320 may be implemented by one or more client devices 350 and processing units in client devices 350. Other implementations consistent with disclosed embodiments are possible as well.

Communication device 660 is configured to communicate with one or more databases, such as database 380 (FIG. 3), either directly or via network 170. In particular, communication device 660 may be configured to receive client orders and/or inventory data feeds through network 170. Balancing system 320 may use this information to determine available inventory and generate and distribute virtual bundle information for customized item listings. In addition, communication device 660 may be configured to communicate with other components as well, including, for example, online resources 340.

Communication device 660 may include, for example, one or more digital and/or analog devices that allow communication device 660 to communicate with and/or detect other components, such as a network controller and/or wireless adaptor for communicating over the Internet. Other implementations consistent with disclosed embodiments are possible as well.

Balancing database 324 may be implemented with one or more storage devices configured to store instructions used by balancing processors 322 to perform functions related to disclosed embodiments. For example, balancing database 324 may store software instructions to perform operations when executed by balancing processors 322. The disclosed embodiments are not limited to separate programs or computers configured to perform dedicated tasks. For example, while in some embodiments balancing database 324 may include a single program that performs the functions of balancing system 320, in other embodiments balancing database 324 may include multiple programs. Balancing database 324 may also store programs 602. Programs 602 may include instructions for training ML models for predicting customer demand for bundled product and arrange bundle balancing to maximize customer retention. For example, programs 602 may include instructions to use bundle records 606 to train algorithms that predict customer demand for bundled products. Further programs 222 may include instructions for configuring FC/warehouse systems 310 and online resources 340 to provide periodic inventory updates that help keep accurate inventory records. Further, balancing database 324 may include cache data 604, where balancing database 324 may store virtual bundle information that will be processed or transmitted to other elements of system 300.

In certain embodiments, balancing database 324 may store sets of instructions for carrying out processes of concurrent and real-time rebalancing of virtual bundles. The instructions may employ optimization algorithms to increase the diversity of the virtual bundles (increase variety of offered bundle groupings) and/or maximize meeting forecasted demand (e.g., increasing the available number of bundles with a high demand bundle quantity). For example, balancing database 324 may be configured to continually collect and update inventory data to update virtual bundle information and generate training datasets to forecast demand for bundled products.

In some embodiments, balancing processors 322 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, balancing processors 322 may be a plurality of devices coupled and configured to perform functions consistent with the disclosure.

In some embodiments, balancing processors 322 may execute software or firmware to perform functions associated with each component of balancing processors 322. In other embodiments, each component of balancing processors 322 may be an independent device. In such embodiments, each component may be a hardware device configured to specifically process data or perform operations associated with modeling traffic behavior, generating identification models, and/or handling large data sets. For example, balancing module 646 may be a field-programmable gate array (FPGA), FC identifier 644 may be a graphics processing unit (GPU), and Encoder 648 may be a central processing unit (CPU). Other hardware combinations are also possible. In yet other embodiments, combinations of hardware and software may be used to implement balancing processors 322.

RT feed module 642 may include stream-processing software. For example, in some embodiments. RT feed module 642 may implement a processing platform such as Apache Kafka®. In such embodiments, RT feed module 642 may include one or more servers running on the processing platform. RT feed module 642 may process data streams and publish data into topics for processing of client orders and inventory data feeds. In such embodiments, RT feed module 642 may be configurable to extract and store key-value messages that come events in data streams from client devices 350. RT feed module 642 may divide data into different "partitions" within different "topics." Within a partition, RT feed module 642 may order key-value messages by their offsets (the position of a message within a partition), and indexed and stored together with a timestamp, which may be determined by a timer.

In some embodiments, RT feed module 642 may be operated with stream APIs that allow writing Java applications that consume data from streams. In some embodiments, the stream API may be provided by communication device 660. In such embodiments, the stream API may enable transforming streams of data from input topics to output topics using RT feed module 642. Further RT feed module 642 may be configurable to work with external stream processing systems such as Apache Apex, Apache Flink, Apache Spark, and Apache Storm. For example, RT feed module 642 may be configurable to import/export data from/to other systems using a connect API that executes connectors that implement the actual logic to read/write data from other systems.

RT feed module 642 may support both regular and compacted topics for processing events. Regular topics can be configured with a retention time or a space bound. If there are records that are older than the specified retention time or if the space bound is exceeded for a partition, RT feed module 642 may be allowed to delete old data to free storage space. In such embodiments, topics developed by RT feed module 642 may be configured with a retention time of 7 days. However, other time windows can be possible.

Moreover, different elements of system 300 may interact with RT feed module 642 using API's supported by balancing system 320. For example, client devices 350 and/or online resources 340 may interact with RT feed module 642 with (1) a producer API, which allows publishing streams of records; (2) a consumer API, which allows to subscribe to topics and processes streams of records; (3) a connector API, executing the reusable producer and consumer APIs that can link the topics to the existing applications, and/or (4) stream API, which converts the input streams to output and produces the result.

In some embodiments. RT feed module 642 may include software and/or hardware configured to extract keys in events coming from data streams. For example, RT feed module 642 may classify and process events in different topic based on keys extracted by a key extractor. RT feed module 642 may process events in data streams by generating messages of key/value pairs. Keys may be used for partitioning and modeling tables and topics (e.g., KSQL or Ktable) for query or join purposes. The keys may include characteristics of the events. For example, keys may include IP address, Client ID, account number, geographical location, or other identifying information of the event.

FC identifier 644 may include software or hardware configured to identify fulfillment centers that can service a client request. For example, FC identifier 644 may include software that identifies an FC based on the location of one or more of client devices 350 (FIG. 3). FC identifier 644 may employ operations to correlate client requests with FCs to determine the inventory that can be offered to the specific request. For example, as RT feed module 642 processes data streams of client requests, FC identifier 644 may select and FC to generate customized websites with the available inventory for the requesting client. FC identifier may employ FC selection algorithms further described in connection with FIG. 15.

Balancing module 646 may include software and/or hardware for the generation and real-time balancing of virtual bundles based on: (1) available inventory (as reported from FCs), (2) stream of client orders, and (3) ML forecast models. Balancing module 646 may employ inventory balancing techniques using priority rules as further described in connection with FIG. 13. Further, balancing module 646 may expose services for real-time inventory management. For example, as further described in connection with FIG. 14, balancing module 646 may determine bundling groupings, generate virtual bundles, and assign pricing to the bundles (e.g., based on market demands and inventory estimates) and expose a REST service to seller portals (such as external front end system 103 in FIG. 1A) that may access this information while generating customized websites.

In some embodiments, balancing module 646 may train ML models in order to balance virtual bundles based on forecast demand and/or to improve accuracy of inventory estimates. In such embodiments, balancing module 646 may include computing components be configured to use data in balancing database 324 to generate machine-learning (ML) models that forecast demand or generate inventory and bundling estimates based on historic data. For example, balancing module 646 may use bundle records 606 to generate predictive models that forecast demand for bundled items and/or pricing demand. In such embodiments, balancing module 646 may include programs (e.g., scripts, functions, algorithms) to train, implement, store, receive, retrieve, and/or transmit one or more ML models. The ML models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, an LSTM-CNN model, a temporal-CNN model, a support vector machine (SVM) model, a Density-based spatial clustering of applications with noise (DBSCAN) model, a k-means clustering model, a distribution-based clustering model, a k-medoids model, a natural-language model, and/or another machine-learning model. Further, models may include an ensemble model (i.e., a model having a plurality of models).

In some embodiments, balancing module 646 may be configured to terminate training when a training criterion is satisfied. Training criterion may include several epochs, a training time, a performance metric (e.g., an estimate of accuracy in reproducing test data), or the like. Balancing module 646 may be configured to adjust model parameters during training. Model parameters may include weights, coefficients, offsets, or the like. Training may be supervised or unsupervised.

Balancing module 646 may be configured to train ML models by optimizing model parameters and/or hyperparameters (i.e., hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Balancing module 646 may be configured to optimize statistical models using known optimization techniques.

Encoder 648 may be software and/or hardware configured to encode item and associated bundles to populate bundle records 606. For example, when balancing system 320 receives inventory data from FC/Warehouse systems 310, encoder 648 may generate item IDs for the items available at the FC. The item IDs may be normalized among multiple FCs and third-party vendors to facilitate aggregation of the items for balancing of virtual bundles. Additionally, or alternatively, encoder 648 may also encode the virtual bundle groups codes to create tags that include information of the item, the bundle quantity or grouping, and the associated price. Further, encoder 648 may create product ID listings with at least four fields for (1) physical item, (2) virtual quantity, (3) bundle price, and (4) per item price. For example, encoder 648 may create an ID for product listing such as "ITEM123-VB2-10-5" having a first field of item ID of "ITEM123," a virtual bundle of 2 "VB2," a bundle price of "10," and a per item price of "5." In some embodiments, encoder 648 may tag or label bundle records 606 to generate training data sets that are used by balancing module 646 for training ML models.

The components of balancing system 320 may be implemented in hardware, software, or a combination of both, as will be apparent to those skilled in the art. For example, although one or more components of balancing system 320 may be implemented as computer processing instructions embodied in computer software in balancing database 324, some or all of the functionality of balancing system 320 may be implemented in dedicated hardware. For instance, groups of GPUs and/or FPGAs maybe used to quickly analyze data in balancing processor 322.

Figure 7:
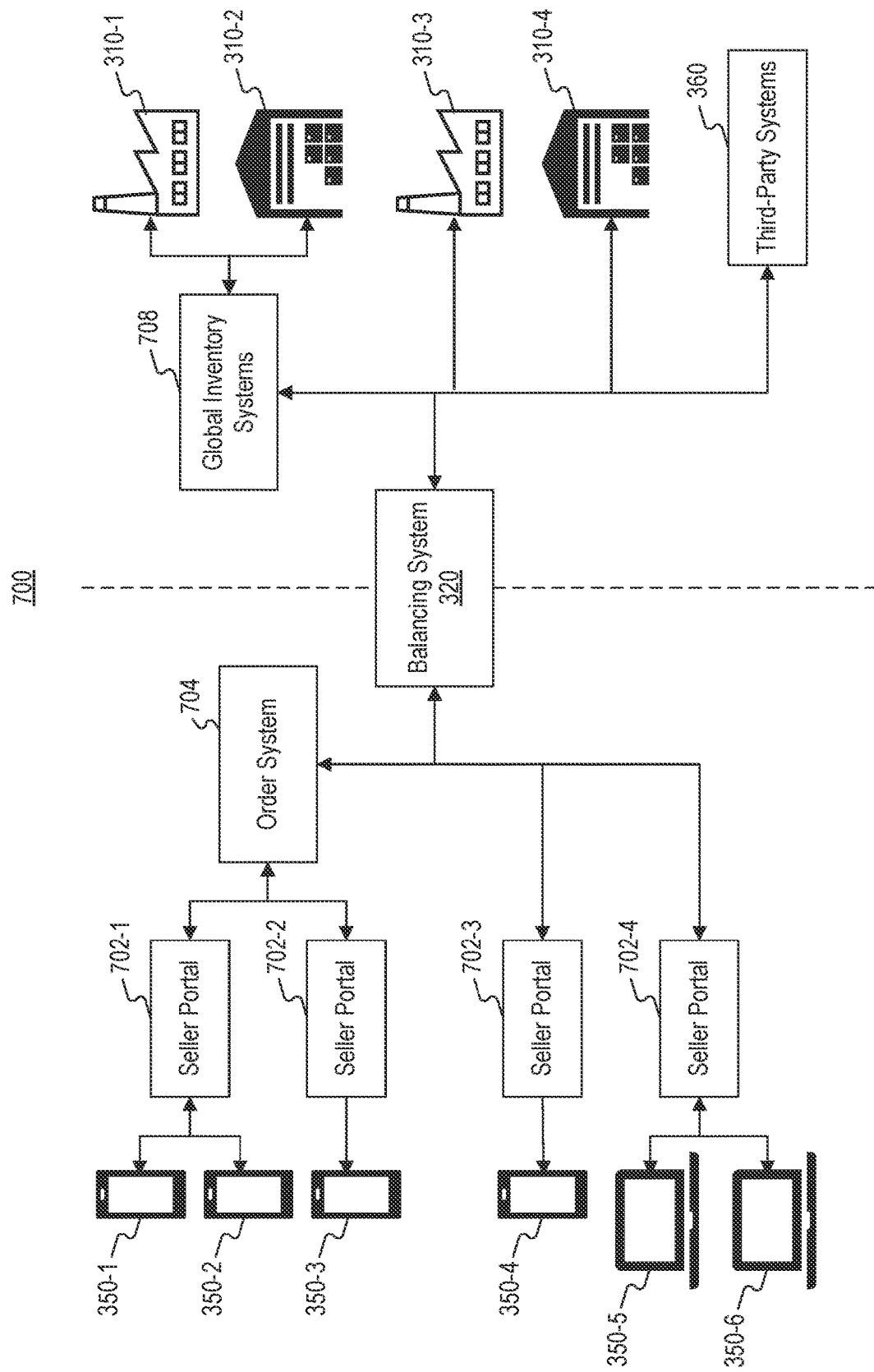
FIG. 7 is a block diagram of an exemplary inventory network, consistent with disclosed embodiments.

FIG. 7 is a block diagram of an exemplary inventory network 700, consistent with disclosed embodiments. Network 700 shows balancing system 320 connecting client devices 350 with FC/Warehouse systems 310 and third-party systems 360 (FIG. 3). As previously discussed in connection with FIGS. 3 and 6, the configuration of network 700 allows balancing system 320 to manage a real-time inventory system that avoids relying on FC/Warehouse systems 310 for estimating available inventory and bundling groups of items. Thus, the configuration shown in network 700 improves real-time inventory systems by reducing network congestion, facilitating automated updates, and providing accurate inventory data to seller portals.

As shown in FIG. 7, client devices 350 in network 700 may be connected to the network through seller portals 702. In some embodiments, seller portals 702 may be programmed and hosted by one or more of external front end system 103 or seller portal 109. Alternatively, or additionally, seller portals 702 may be websites configured by online resources 340 based on balancing system 320. In such embodiments, when creating a website for display in client devices 350, seller portals 702 may query balancing system 320 (e.g., by querying balancing database 324) to determine available inventory and available virtual bundles that can be displayed to client devices 350. For example, seller portals 702 may generate GUIs and websites as described in connection with FIG. 19.

As shown in FIG. 7, seller portals 702 may include multiple seller portals having a seller portal 702-1, seller portal 702-2, seller portal 702-3, and seller portal 702-4. Each one of the seller portals may be configured to display customized websites for client devices 350. For example, depending on the location of client devices 350, each of seller portals 702 may generate a customized website showing different inventory and/or availability of virtual bundles. In such embodiments, balancing system 320 may assign different FCs to each one of the seller portals 702 (e.g., using FC identifier 644 (FIG. 6)) and each seller portal may access customized inventory and virtual bundle information depending on the assigned one of FC/Warehouse system 310. Similarly, seller portals 702 may also generate and host websites with customized product listings by sourcing information from third-party systems 360.

Some of seller portals 702 may connect to balancing system 320 through an order system 704. Order system 704 may be configured to process customer orders and transmit processed information to balancing system 320. For example, order system 704 may process and verify payments before it transmit information to balancing system 320 for updating inventory data and/or initiating fulfillment processes. Further order system 704 may perform operations to manage purchase order process, end to end. For example, order system 704 may generate purchase orders, track, and manage associated paperwork, in such embodiments, order system 704 may also process returns and refunds and transmit that information to balancing system 320 to generate an accurate real-time inventory account that not only takes into account inventory data feeds and purchases but also returns to have an accurate representation of available inventory and balancing of bundled items. While some seller portals 702 may connect through order system 704, other seller portals may have direct access to balancing system 320. For example seller portal 702-3 and seller portal 702-4 may connect directly to balancing system 320 because they may have order processing capabilities and/or they may server a different segment of client devices 350 that do not require order system 704.

Moreover, in some embodiments order system 704 may include global retail order fulfillment systems that perform operations of customized labeling and packing lists, dedicated and shared operations, reverse logistics including consumer returns management, Electronic Data Interchange (EDI) compliance, cross docking, and e-commerce services (visibility of orders, stock levels, and shipping information).

In network 700, balancing system 320 may also be coupled to multiple FC/Warehouse systems 310 of an FC network. Balancing system 320 may enable the centralization of multiple FC inventories to maximize product listing diversity and capture client demand even when one item and/or one of the virtual bundles has a heavy demand. Moreover, balancing system 320 may also aggregate inventory information from third-party systems 360 to create aggregated datasets of inventory that can be used for balancing virtual bundles and maximize variety and availability of product listings. In some embodiments, some of FC/Warehouse systems 310 may connect to balancing system 320 through global inventory systems 708 that collect and process information. For example, global inventory systems 708 may include automated cloud-based purchase order configured to eliminate redundancy from the purchase order process. In such embodiments, global inventory system 708 may also be programmed to create metrics reflecting the status of overall inventory and forecasted demand. For example, global inventory system 708 may perform forecasting tasks employing ML models as discussed in connection to FIG. 6. Because global inventory system 708 has information from multiple of FC/Warehouse systems 310, global inventory system 708 may be in the position to develop forecasts of predictions for the network of FCs.

While some of FC/Warehouse systems 310 may connect through inventory system 708, other FC/Warehouse systems 310 may connect directly to balancing system 320. For example, FC/Warehouse system 310-1 and FC/Warehouse system 310-2 may connect directly to global inventory systems 708 because they are part of the same seller or have share inventory agreements. In contrast, FC/Warehouse system 310-3 and FC/Warehouse system 310-4 may connect directly to balancing system 320. Similarly, third-party system 360 may get connected directly to balancing system 320 to provide information about their inventory. In some embodiments, balancing system 320 may create virtual bundles that segregate inventory from third-party systems 360 to avoid product mingling. In other embodiments, however, balancing system 320 may be configurable to accept product mingling and use any inventory available in network 700 to generate virtual bundles and provide information (e.g., through REST API methods) to seller portals 702 to display in client devices 350.

Figure 8A:
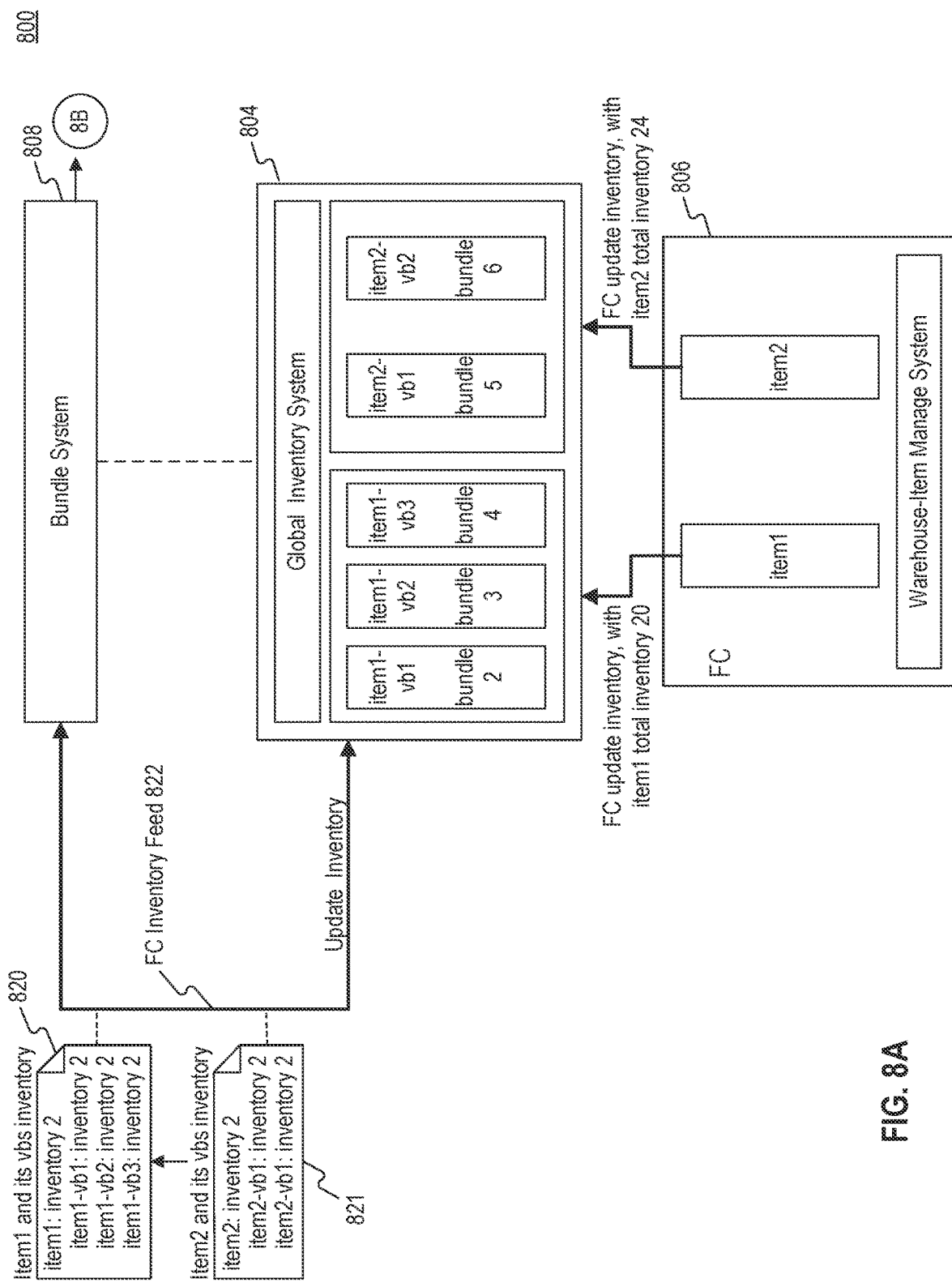
FIG. 8A is a first part of a block diagram of an exemplary unbalanced inventory system, consistent with disclosed embodiments.

FIG. 8A is a first part of a block diagram of an exemplary unbalanced inventory system 800, consistent with disclosed embodiments. In unbalanced inventory system 800 a warehouse-item management system 806 may provide inventory information to a global inventory system 804. For example, inventory systems in center 200, including sensors 217A-217C (FIG. 2), may provide inventory data that is available at the FC or the warehouse. As shown in FIG. 8A, warehouse-item management system 806 may provide inventory information by specifying the number and type of items available in the ware house.

Global inventory system 804 may generate a plurality of virtual bundles. For example, based on the information received from warehouse-item management system 806. As shown in FIG. 8A, global inventory system 804 may generate virtual bundles for items received from warehouse-item management system 806, dividing the number and type of items in different bundles with a different bundle quantity (VB) and a different bundle ID. In some embodiments, global inventory system 804 may communicate the virtual bundle information to a bundle system 808 which may provide information to seller portals to crate portals for generating websites with product listing that include bundles with customized pricing. In such embodiments, global inventory system 804 and bundle system 808 may connected through and FC inventory feed 822 that exchange data between the systems. For example, FC inventory feed 822 may transmit first item record 820 and second item record 821 to bundle systems 808.

Figure 8B:
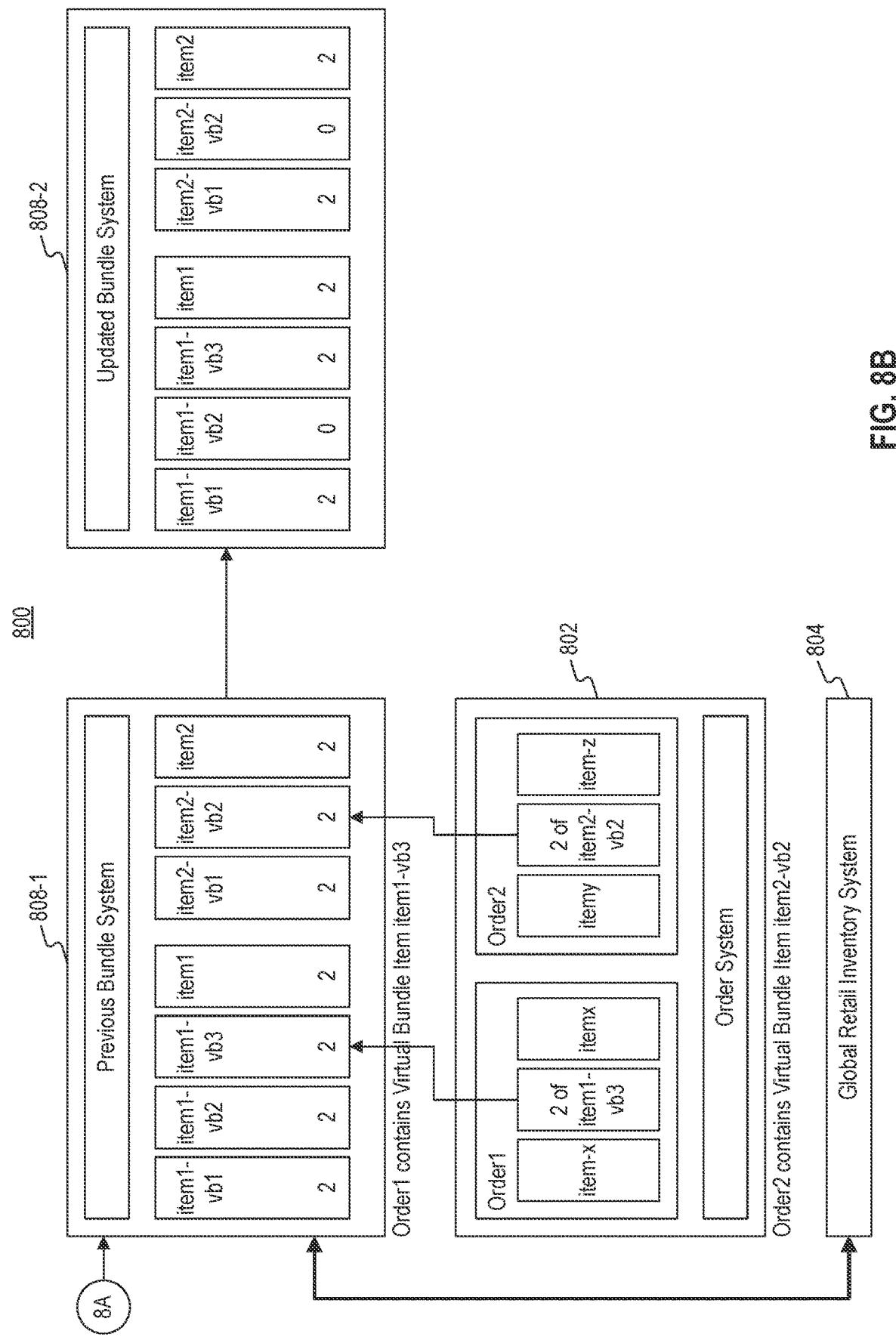
FIG. 8B is a second part of a block diagram of an exemplary unbalanced inventory system, consistent with disclosed embodiments.

FIG. 8B is a second part of a block diagram of an exemplary unbalanced inventory system 800, consistent with disclosed embodiments. FIG. 8B shows changes on the inventory systems triggered by an order received from an order system 802. As shown in FIG. 8B, order system 802 may send information to bundle systems 808 of order requests for an item 1 and an item 2. The orders may include client requested bundles and/or client requested items. The bundle system 808 may then receive the request and modify the virtual bundles to reflect a decrease in inventory numbers Thus bundle system 808-1 (reflecting the pre-order state of the bundle system 808) changes to an updated bundle system 808-2 (reflecting the post-order state of the inventory system). In some embodiments, as shown in FIG. 8B global retail inventory system 804 may provide information to bundle system 808 (as discussed in connection with FIG. 8A) and update the overall available inventory based on changes in bundle system 808.

Unbalanced inventory system 800 shows that some of the bundled items may become unavailable while other items in the same category continue to be available in different bundles. This means that in unbalanced inventory system 800 a customer may not be able to buy a specific bundle when it is in high demand until there is an inventory feed from warehouse-item management system 806. This may create false out-of-stock issues when there is a rapid succession of orders from order system 802. Nonetheless, unbalanced inventory system 800 may minimize network congestion and/or enable real-time inventory updates by having synchronized data feeds from warehouse-item management system 806 and global inventory system 804 and/or bundle system 808.

Figure 9A:
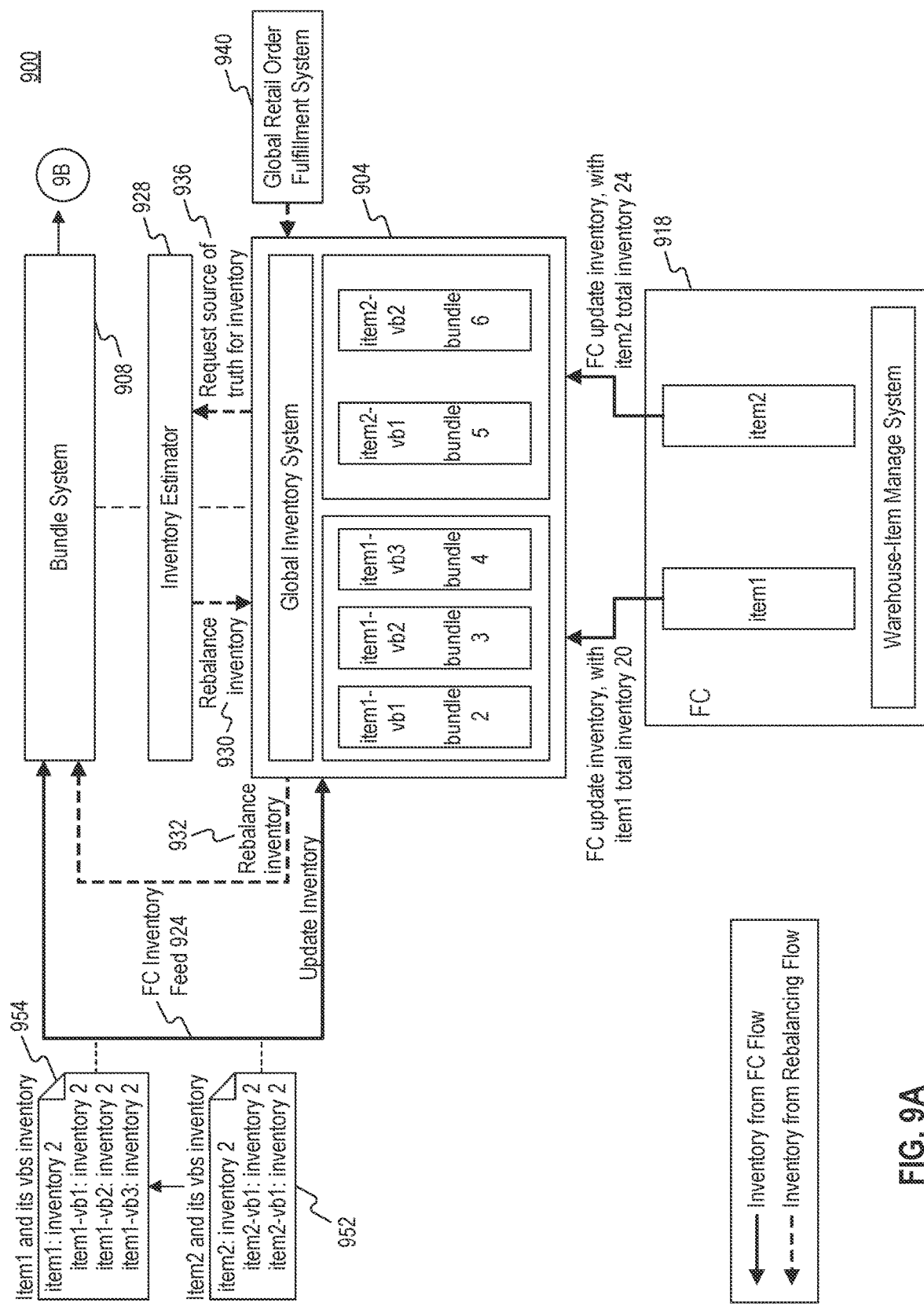
FIG. 9A is a first part of a block diagram of an exemplary balanced inventory system, consistent with disclosed embodiments.

FIG. 9A is a first part of a block diagram of an exemplary balanced inventory system 900, consistent with disclosed embodiments. Like in unbalanced inventory system 800, in balanced inventory system 900, a warehouse-item management system 918 may be coupled to a global inventory system 904. Warehouse-item management system 918 is configured to transmit orders to global inventory system 904. For example, global inventory system 904 may receive inventory data from warehouse-item management system 918 and generate a plurality of virtual bundles with different groupings, pricing, and availability.

Similar to unbalanced inventory system 800, in balanced inventory system 900, global inventory system 904 may get connected with bundle system 908 through an FC inventory feed 924 that transmit first item record 954 and second item record 952 to bundle systems 908. However, unlike unbalanced inventory system 800, in balanced inventory system 900, an inventory estimator 928 may be configured to read inventory from platforms that rebalance inventory and/or handle requests of truth for inventory from global inventory system 904 by performing operations of reading inventory from inventory estimator 928 that may estimate available inventory without having to communicate with warehouse-item management system 918. For example, global inventory system 904 may request source of truth for inventory in step 936 and the inventory estimator 928 may respond to the request with a rebalanced inventory in step 930. Moreover, global inventory system 904 may also be configured to transmit rebalance inventory in step 932 to the bundle system. For example, global inventory system 904 may communicate rebalanced inventory based on client orders that supplement the information from FC inventory feed 924. Accordingly, embodiments employing balanced inventory system 900 may have faster response to inventory changes and provide a more accurate and diversified product listings.

Moreover, in some embodiments, global inventory system 904 may receive orders from a global retail order fulfillment system 940. For example, in embodiments in which FC networks include both local and third-party vendors or sellers, global retail order fulfillment system 940 may aggregate and process information from different client and vendor networks to provide normalized orders to global inventory system 904.

Figure 9B:
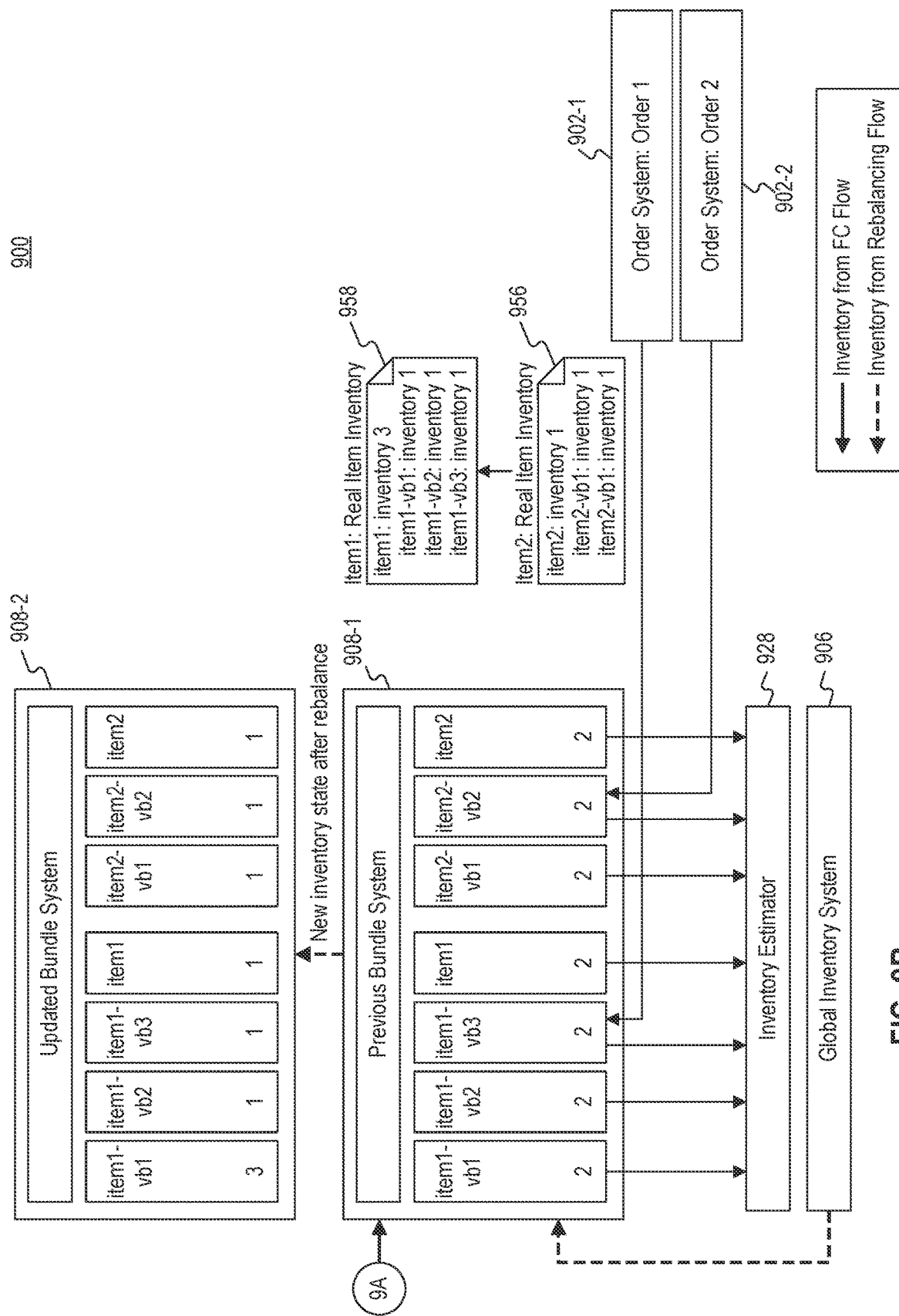
FIG. 9B is a second part of a block diagram of an exemplary balanced inventory system, consistent with disclosed embodiments.

FIG. 9B is a second part of a block diagram of an exemplary balanced inventory system 900. FIG. 9B details changes in the bundled system in response to orders that may come, for example, from client devices 350 (FIG. 3). As shown in FIG. 9B, order systems 902 may send orders to inventory systems. For example, order system 902-1 may send a first order 958 for a first item and order system 902-2 may send a second order 956 for a second item. The orders may specify the order type and a bundle quantity. The orders may also specify the inventory ID from which the order should be processed. For example, because client devices 350 may display customized websites based on their location, the orders from order systems 902 may specify an FC or warehouse from which the inventory should get subtracted. FIG. 9B shows bundle system 908-1 with a previous virtual bundle group (before processing orders from order systems 902) and an updated balancing system 908-2 (after processing the orders). As shown in FIG. 9B, unlike unbalanced inventory system 800, in balanced inventory system 900 none of the virtual bundles end up with a zero quantity because bundle system 908 rebalances the virtual bundles based on the orders without communication from warehouse-item manage system 906.

Moreover, bundle system 908 may transmit the previous and updated bundle information to inventory estimator 928, which may in turn connect with global inventory system 906 to refresh or update product listings in websites. Further, in some embodiments inventory estimator 928 may collect the changes in bundle system 908 to generate training datasets that can be used for generating ML models that forecast demand for specific bundled items. For example, inventory estimator 928 may populate bundle records 606 to provide datasets to balancing module 646 to generate ML models that inform the development of bundled assignments.

Moreover, as shown in FIG. 9B, global inventory system 906 may communicate with bundle system 908 to provide information for rebalancing virtual bundles. For example, as further discussed in connection with FIG. 9A, global inventory system 906 may transmit rebalance inventory in step 932 by communicating with bundle system 908.

Figure 9C:
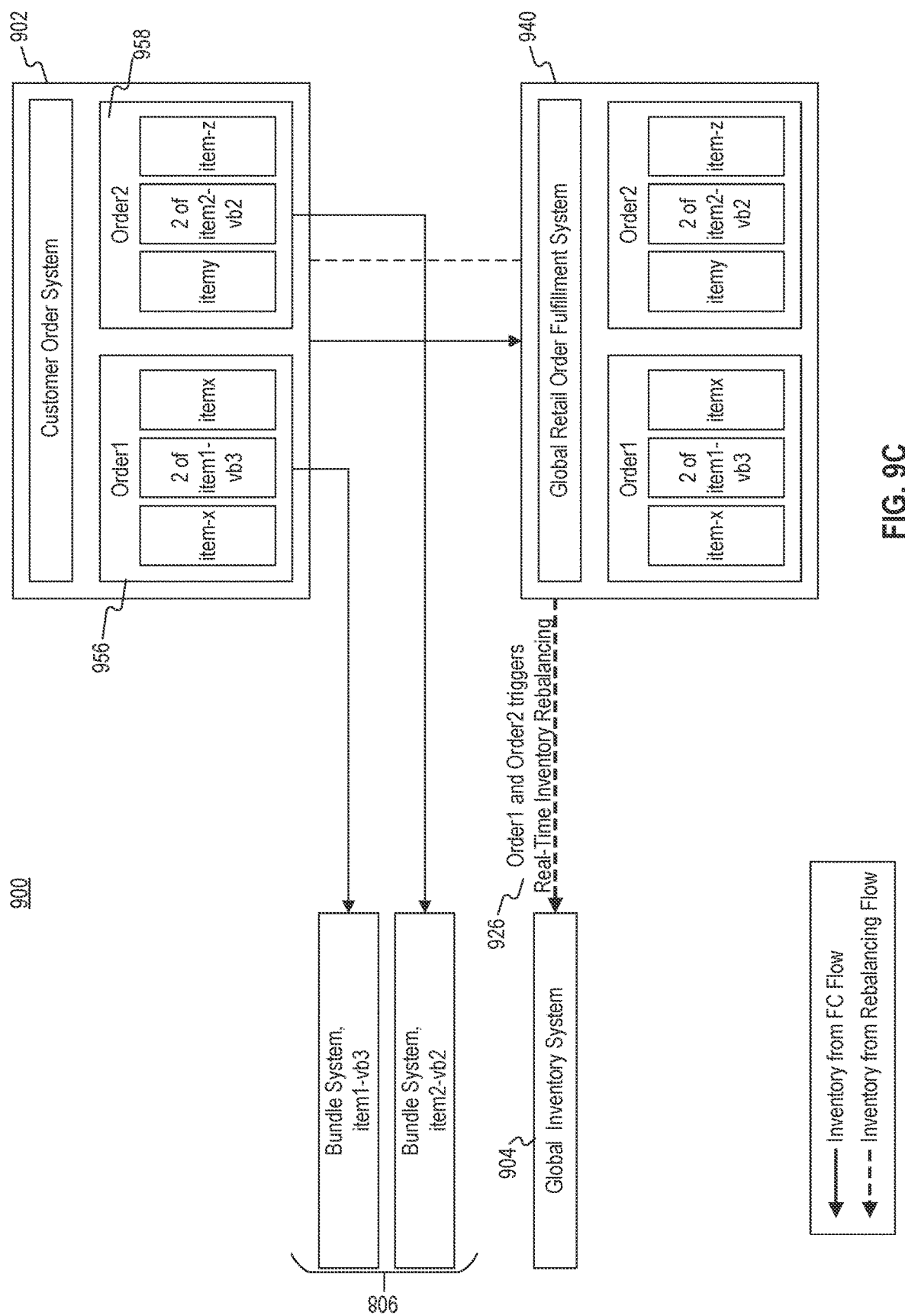
FIG. 9C is a third part of a block diagram of an exemplary balanced inventory system, consistent with disclosed embodiments.

FIG. 9C is a third part of a block diagram of an exemplary balanced inventory system 900. FIG. 9C shows additional detail of the order process that generates the changes in bundle system 908. FIG. 9C shows orders system 902 generating first order 958 and second order 956. As described in FIG. 9B, these orders may get transmitted to bundle system 908 generating the changes between the previous bundle system 908-1 and the updated bundle system 908-2. In some embodiments, orders from orders system 902 may be directed through global retail order fulfillment system 940, which may communicate with global inventory system 904. For example, global retail order fulfillment system 940 may create real-time inventory feeds 926 that trigger inventory rebalancing based on orders from order system 902.

Balanced inventory system 900 allows to perform dynamic inventory balancing that improves real-time inventory management by minimizing false OOS and provide a dynamic inventory management process that combines FC/warehouse data (e.g., through warehouse-item manage system 906), customer data (e.g., through order system 902), and forecasted bundle demand to continuously balance virtual bundles in global inventory system 904 to have more accurate inventory information and provide greater diversity of product listings to maximize customer retention.

Figure 10:
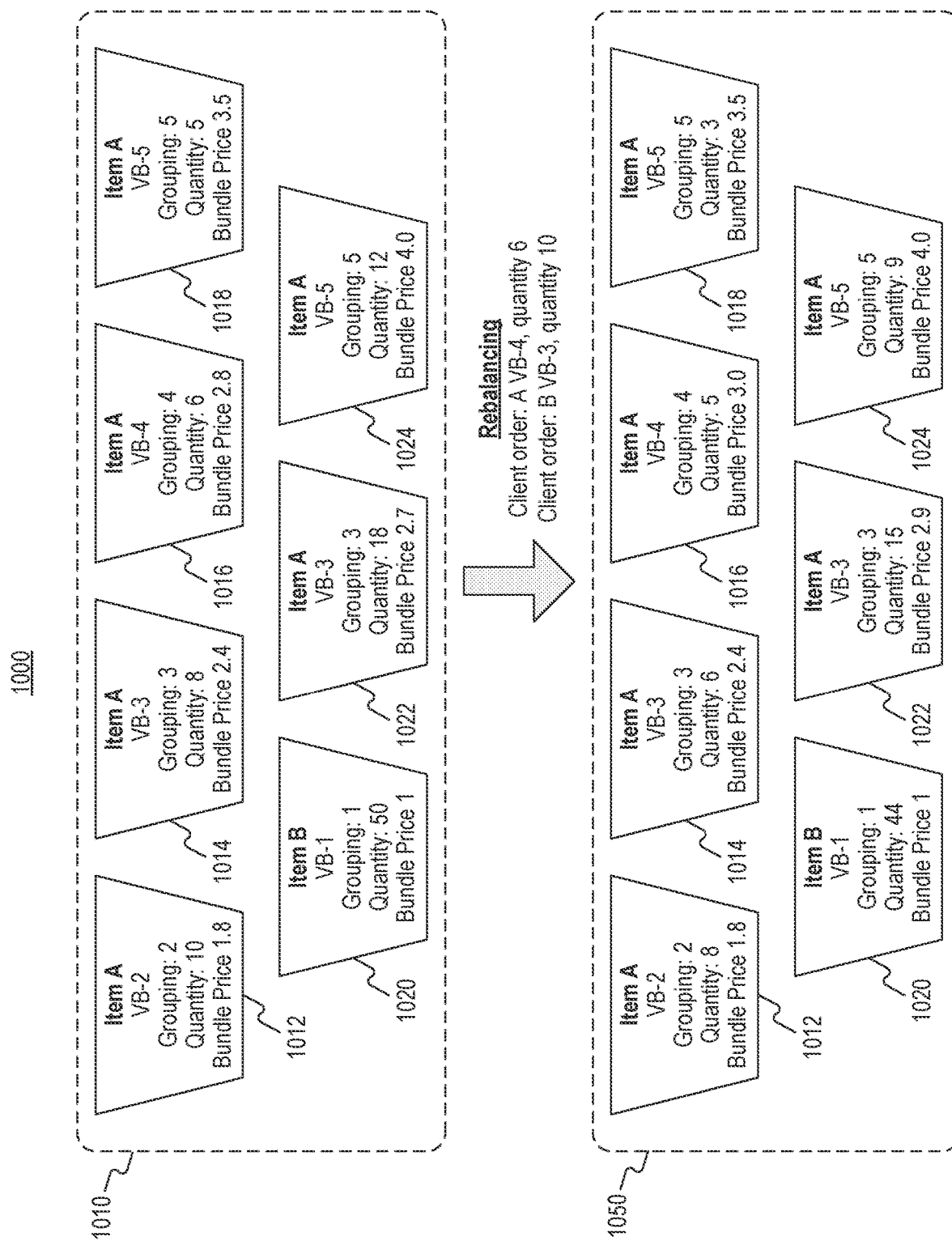
FIG. 10 is a schematic representation of a virtual bundle rebalancing operation, consistent with disclosed embodiments.

FIG. 10 is a schematic representation of a virtual bundle rebalancing operation 1000, consistent with disclosed embodiments. Operation 1000 shows a group of first virtual bundles 1010 organizing inventory before rebalancing (e.g., before receiving a client order) and second virtual bundles 1050 after rebalancing (e.g., after receiving and processing a client order). As shown in FIG. 10, each one of the virtual bundles includes an item type, a grouping number, a quantity of available bundles, and a bundle price, for the complete bundle. In some embodiments, balancing system 320 may generate first virtual bundles 1010 when it receives inventory data from FC/Warehouse systems 310 (FIG. 3).

First virtual bundles 1010 includes a two item A bundle 1012, a three item A bundle 1014, a four item A bundle 1016, and a five item A bundle 1018. Each of the bundles 1012-1018 have the same item, item A, but each of the bundles 1012-1018 have a different grouping number (i.e., each bundle has a different number of bundled items), a different available quantity of bundles (i.e., the number of bundles available in the inventory), and a different bundle price. In this way, balancing system 320 may control the availability of bundled items and also tailor pricing of bundles to incentivize certain type of purchases and/or meet demand for certain specific bundles.

First virtual bundles 1010 may also include virtual bundles for a different item B. For example, first virtual bundles 1010 includes may include a one item B bundle 1020, a three item B bundle 1022, and a five item B bundle 1024. Each of the bundles 1020-1024 have the same item, item B, but each of the bundles 1020-1024 have a different grouping number, a different available quantity of bundles, and a different bundle price.

Additional virtual bundles may be configured for first virtual bundles 1010. For example, virtual bundles may be configured for an item C (not shown) or for combination bundles that merge different types of items. For instance, virtual bundles 1010 may include a merged bundle having both items A and B in a single bundle (not shown). In this way, first virtual bundles 1010 may provide customizable and tailored product listings for multiple items and/or combination of items. In such embodiments, the selected combination of items or the selected items for bundling may be based on forecast demand or marketing data. For instance, balancing module 646 (FIG. 6) may generate a plurality of bundles in first virtual bundles 1010 based on ML models that forecast product demands and/or determine likelihood of purchases for bundled items. Alternatively, or additionally, balancing system 320 may base the groups of virtual bundles according to excess inventory or marketing campaigns.

First virtual bundles 1010 may get updated in response to a client order that triggers rebalancing operations in balancing system 320 (FIG. 3). For example, as shown in FIG. 10, a client order may request six of four item A bundle 1016

(i.e., an order for six of bundle 1016, for a total of 24 items) and ten of three item A bundle 1022 (i.e., an order of ten bundle 1022, for a total of 30 items). This order will decrease the available inventory, but in order to maintain maximum diversity of available bundles and minimize false OOS notices, balancing system 320 may perform rebalancing operations. In the rebalancing operations, inventory systems do not merely subtract the ordered number of items from the bundle 1022 and bundle 1016. Instead, balancing system 320 performs a balancing operation to generate second virtual bundles 1050 with a decreased number of items but maintaining diversity of available bundles.

Thus, second virtual bundles 1050 may include two item A bundle 1012, three item A bundle 1014, four item A bundle 1016, and five item A bundle 1018 like first virtual bundles 1010. The grouping number of bundles 1012-1018 may be the same as in first virtual bundles 1010. However, other parameters of the virtual bundles may change. For example, the quantity of each bundle may change to reflect that the total number items available for bundling has decreased. As shown in FIG. 10, the quantity for each one of bundles 1012-1018 may have decreased due to the rebalancing process of balancing system 320. Additionally, bundle price associated with each of the bundles 1012-1018 may also be updated as balancing system 320 adjust prices according to demand forecasts and/or ML models that help determine the likelihood of purchases in orders and/or the interest in specific bundles. For example, balancing system 320 may determine discounted prices for certain virtual bundles. But regardless of whether there are changes in bundle quantity and price, balancing system 320 may be configurable to rebalance virtual bundles to maximize diversity of available bundles. Thus, balancing system 320 may redistribute items in second virtual bundles 1050 to have the most even number of virtual bundles in the second virtual bundles 1050.

Second virtual bundles 1050 may also include item B bundles that have been rebalanced to maximize bundle diversity. Second virtual bundles 1050 may include one item B bundle 1020, three item B bundle 1022, and five item B bundle 1024. The grouping of the virtual bundles may be the same as before but the quantity and price associated with each of the bundles 1020-1024 may be updated to reflect a lower number of total items and price adjustments based on forecasted demand, marketing campaigns, and/or repurchase prices (e.g., from third-party systems 360).

The operation 1000 shows how balancing system 320 may estimate available inventory and rebalance virtual bundles without having to query FC/Warehouse systems 310. Thus, employing operation 1000 may facilitate management of real-time inventory systems that update allow configuration of online retail website with updated information that maximize availability of product listings and avoid false OOS status. As further discussed in connection with FIG. 13, operation 1000 may be based on processes that determine balancing of virtual bundles based on forecasted demand to generate priorities and/or make exceptions to the general rule of maintaining greatest diversity of available bundles.

Figure 11:
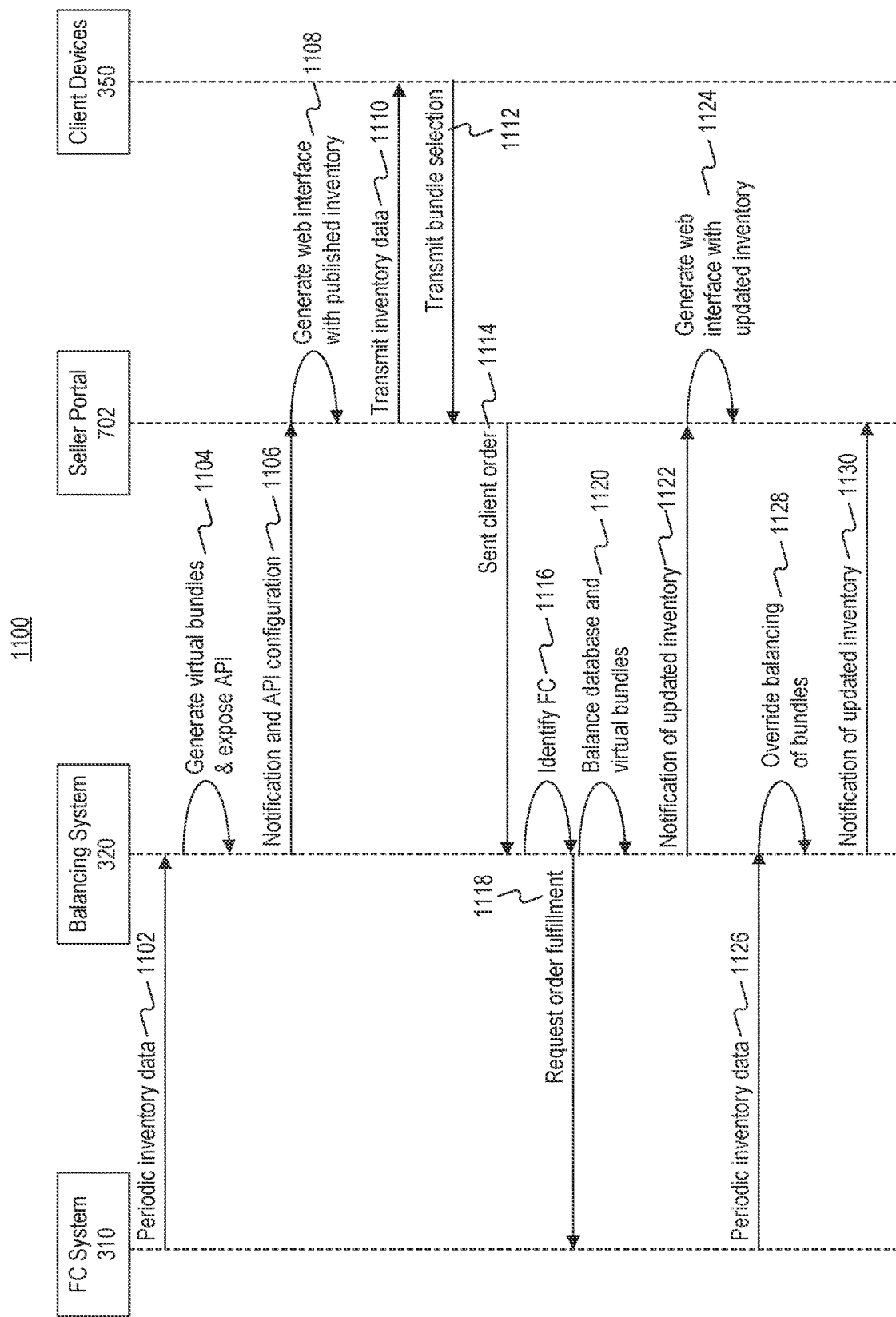
FIG. 11 is a timing diagram of a process for virtual bundle balancing, consistent with disclosed embodiments.

FIG. 11 is a timing diagram of a process flow 1100 for virtual bundle balancing, consistent with disclosed embodiments. In some embodiments, as shown in FIG. 11, different elements of system 300 (FIG. 3) may perform specific steps of process flow 1100. For example, components of balancing system 320 may perform one or more steps of process flow 1100 and client devices 350 may perform additional steps of process flow 1100. As shown in FIG. 11, other elements may also participate in process flow 1100. For example, elements of network 700, such as seller portals 702, may perform certain operations in process flow 1100. In other embodiments, however, alternative elements of system 300 and network 700 may perform the described steps (e.g., databases 380 may perform certain steps) or a single element of system 300 or network 700 may perform the described steps.

In step 1102, FC/Warehouse system 310 may send periodic inventory data to balancing system 320. For example, as discussed in connection with FIGS. 8 and 9. FC/Warehouse system 310 may send information of the number of available items in the warehouse. In some embodiments, information transmitted in step 1102 may be synchronized with sensors and inventory systems of the FC. For example, periodic inventory data may be configured to be automatically generated based on scanned codes, sensors (like sensors 217 in FIG. 2), and image analysis. Moreover, in some embodiments, information transmitted in step 1102 may be sent through data feeds that are parsed and analyzed by RT feed module 642. Alternatively, or additionally, FC/Warehouse system 310 may be configured to transmit inventory data at least once a day to trigger dynamic rebalancing of inventory at balancing system 320.

In step 1104, balancing system 320 may generate virtual bundles and expose API or queue services. For example, balancing system 320 may generate a plurality of virtual bundles and communicate them to a global inventory system. As described in connection with FIGS. 8 and 9 the global inventory system may respond to inventory queries from seller portals to generate customized or updated retail websites. In some embodiments, in step 1104 balancing system 320 may distribute inventory in different virtual bundles, as described in connection with FIG. 10, assign pricing based on ML models, marketing campaigns, and/or forecasted demand. This information may then be available for other elements of system 300 or network 700 to, for example, generate websites and/or handle client requests.

In step 1106, balancing system 320 may transmit a notification and API configuration to seller portal 702. For example, balancing system 320 may send a notification of updated inventory to seller portals and provide information to access the updated inventory and virtual bundle information. In some embodiments, balancing system 320 may provide information tailored for seller portal 702 specific market. For example, balancing system 320 may perform operations to identify an FC (e.g., using FC identifier 644) and provide inventory information to seller portal 702 in step 1106.

In step 1108, balancing system 320 may generate a web interface with published inventory. For example, as further discussed in connection with FIG. 19, seller portal 702 may generate GUIs and websites that show available inventory for an item and bundled options with their associated prices. In step 1110, seller portal 702 may transmit the inventory data to client devices 350. For example, in response to a client request for a retailer website, seller portal 702 may provide inventory data to generate a website with the inventory information in step 1110. Further, in step 1110 seller portal 702 may be configured to transmit availability and price of the plurality of bundles to client devices by querying the database through one or more API calls.

In step 1112, client devices 350 may transmit a bundle selection to seller portal 702 (FIG. 11). For instance, a user of client devices 350 may interact with the websites generated in step 1108, and transmitted in step 1110, to order one or more items and/or one or more bundles.

In step 1114, seller portal 702 may send the client order to balancing system 320. As discussed in connection with FIG. 7, to have the ability of monitoring inventory and rebalance virtually bundled items in real time, balancing system 320 may be configured to interface between client devices 350 and FC/Warehouse systems 310. Thus the orders may be routed first to balancing system 320 which may adjust virtual bundles based on client orders as described in connection with FIG. 10. Moreover, in step 1116, balancing system 320 may identify an FC for fulfilling the client order and bundle selection. For example, employing the process described in connection with FIG. 15, balancing system 320 may select an FC that has the ability to fulfill the client order. In some embodiments, however, balancing system 320 may process orders through global inventory systems 708 (FIG. 7) to aggregate inventories from multiple FCs or warehouses that can fulfill the client order.

In step 1118, balancing system 320 may request order fulfillment. For example, balancing system 320 may send a message to selected FCs to fulfill order received in step 1114. For example, balancing system 320 may, in response to receiving the client order, identify a selected fulfillment center for the client order from the at least one fulfillment center and communicating the client order to the selected fulfillment center. In step 1120, balancing system 320 may balance database and virtual bundles. Based on the client orders, and without having to communicate with FC/Warehouse systems 310, balancing systems 320 may balancing virtual bundles as described in connection with FIGS. 9 and 10, to maximize the diversity of virtual bundles, adjust prices, and create additional bundles or modify the bundle quantities based on forecasted demand. For instance, in certain embodiments balancing system 320 is configured to dynamically balance inventories whenever a client purchases a bundle item.

In step 1122, balancing system 320 may generate a notification of updated inventory and transmit it to seller portal 702. For example, balancing system 320 may notify seller portal 702 that the inventory database has been modified through API methods. Alternatively, or additionally, balancing system 320 may employ encoder 648 to generate new item and bundle codes and refresh or update websites being displayed in client devices 350 and/or hosted in seller portals 702. In step 1124, seller portals 702 may generate a web interface with updated inventory. For example, as discussed in connection with FIG. 19, seller portal 702 may update the website shown in client devices 350 to reflect changes in inventory, pricing, and/or the virtual bundle availability.

In step 1126. FC/Warehouse system 310 may generate a renewed message with periodic inventory data. For example, at the end of every day or every 15 minutes. FC/Warehouse system 310 may report available inventory to balancing system 320. In such embodiments, FC/Warehouse system 310 may be configured to generate an inventory data feed at least once a day to trigger the dynamic balancing of inventorying by balancing system 320. Alternatively, or additionally, in some embodiments FC/Warehouse system 310 may connect with balancing system 320 using FC data feeds as discussed in connection with FIGS. 8 and 9. In step 1128, balancing system 320 may override estimated inventories (e.g., if there are discrepancies between estimated and received inventory balancing system 320 may favor inventory data received from FC/Warehouse system 310). Further, in step 1128 balancing system 320 may rebalance the virtual bundles and/or create new virtual bundles based on the information provided by FC/warehouse system 310 in step 1126.

In step 1130, like in step 1122, balancing system 320 may transmit a notification of updated inventory to seller portal 702 to reflect changes in the available inventory. Thus, in step 1130 balancing system 320 may receive updated inventory data from the at least one fulfillment center, rebalance the plurality of bundles in the database based on the updated inventory data; and, in response to updating the plurality of virtual bundles, notify the seller portal of changes in the database.

FIG. 12 is an exemplary table 1200 in a database storing virtual bundle information, consistent with disclosed embodiments. Table 1200 includes a plurality of virtual bundles 1230. Each of the virtual bundles 1230 may be associated with an item ID field 1202, virtual bundle field 1204, bundle category field 1206, SKU field 1208, a price ratio field 1210, a bundle quantity field 1212, and a bundle status field 1214. Table 1200 may be stored in balancing system 320. For example table 1200 may be store in balancing database 324 as part of bundle records 606 (FIG. 6). Alternatively, or additionally, table 1200 may be part of database 380 or other memory device in system 300.

In addition to the bundle identification fields 1202-1214, table 1200 may also include fields for identifying vendors and/or ability to bundle items with additional items. For example, table 1200 may also include a bundle merger field 1216, a seller product ID field 1218, and upload ID field 1220, and a marketing campaign field 1222. Fields 1216-1222 may be used by balancing system 320 to generate virtual bundles and/or determine bundling or price rules.

Table 1200 may be accessible to seller portals 702 and/or client devices 350 for generating websites and managing inventory. For example, table 1200, and databases containing table 1200, through at least one of RESTful service, a queue based system, an index, or an object table. In some embodiments, table 1200 may support GET methods from seller portals 702. In such embodiments, table 1200 may be configured to be updated dynamically and in real-time as balancing system 320 receives and processes orders.

Figure 13:
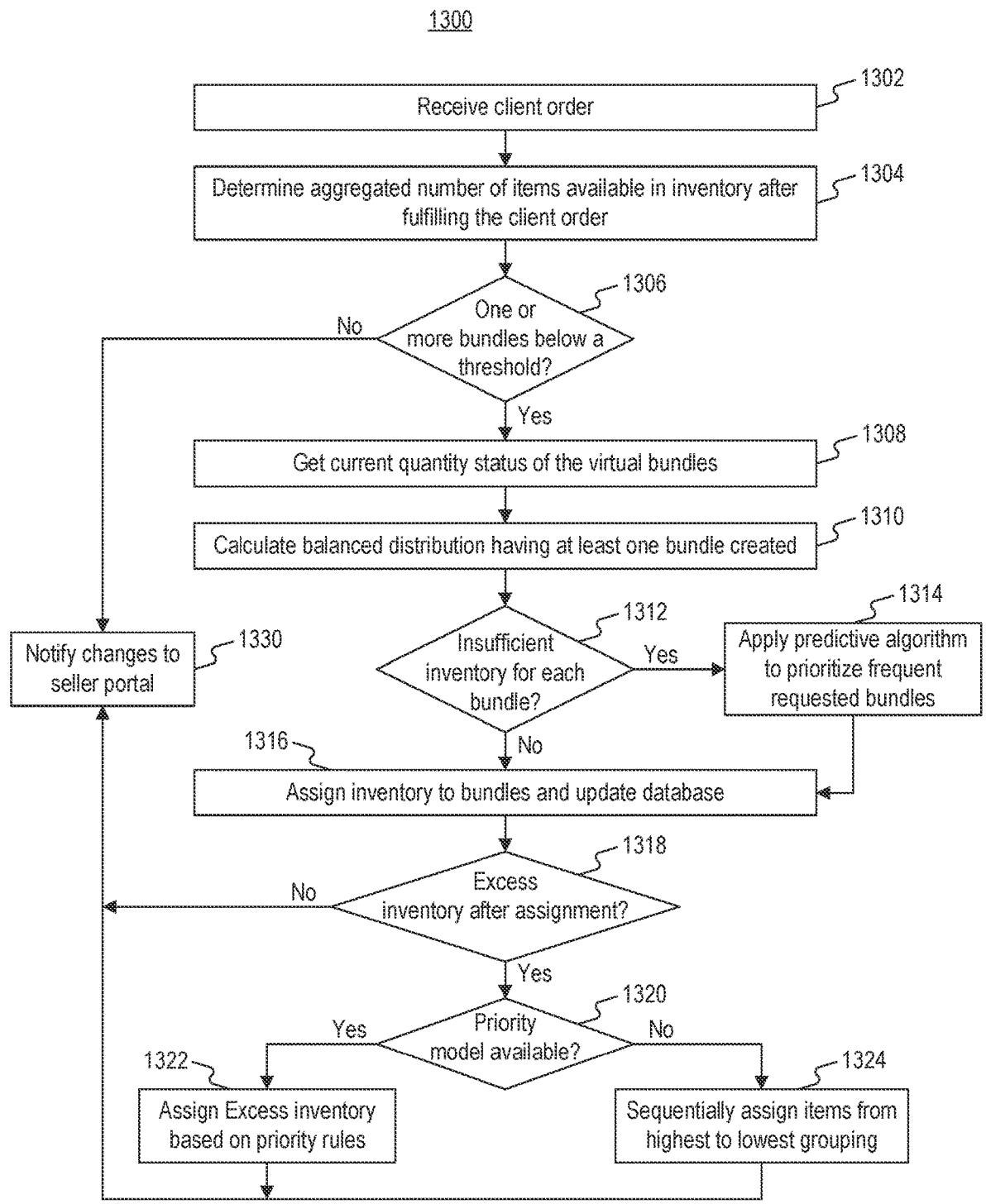
FIG. 13 is a flow chart of an exemplary process for managing virtual bundles based on available inventory, consistent with disclosed embodiments.

FIG. 13 is a flow chart of an exemplary process 1300 for managing virtual bundles based on available inventory, consistent with disclosed embodiments. In some embodiments, elements of system 300 may perform process 1300. For example, as disclosed in the steps description below, balancing system 320 may perform process 1300. In particular, balancing module 646 may perform steps of process 1300. Alternatively, or additionally, other elements of system 300 may perform one or more steps of process 1300. For example, databases 380, client devices 350, or online resources 340 may perform process 1300, or parts of process 1300. Further, in some embodiments systems 800 and 900, or parts thereof, may perform process 1300. For instance, bundling system 908 may perform process 1300.

In step 1302, balancing system 320 may receive a client order. For example, balancing system 320 may receive an order from one of client devices 350 and/or an order system 704 (FIG. 7). In step 1304, balancing system 320 may determine aggregated number of items available in inventory after fulfilling the client order. For example, balancing system 320 may aggregate the remaining virtual bundles to determine a total number of unbundled items. In some embodiments, for example, balancing system 320 may calculate the items in first virtual bundles 1010 (FIG. 10) to calculate an estimated total of items.

In step 1306, balancing system 320 may determine whether one or more bundles are below a threshold. For example, based on virtual bundle rules balancing system 320 may determine that each virtual bundle should have a minimum quantity of, for example, two bundles. If none of the virtual bundles falls to a quantity below a threshold (step 1306: No), balancing system 320 may decide not to perform the rebalancing operation to save computer resources and continue to step 1330. In step 1330, balancing system 320 may notify a seller portal that there are no changes in the inventory (i.e., there is no rebalancing). However, if one of the virtual bundles falls to a quantity below a threshold (step 1306: Yes), balancing system 320 may continue to step 1308. In step 1308, balancing system 320 may get current quantity status of the virtual bundles. For example, balancing system 320 may determine the quantity of each one of the virtual bundles that has been identified or created. In step 1310, balancing system 320 may calculate a balanced distribution of items that results in at least one available virtual bundle for each grouping number. That is, in step 1310 balancing system 320 may distribute available items sequentially to provide the greatest diversity of virtual bundles with the available inventory.

In step 1312, balancing system 320 may determine whether there is insufficient inventory for each bundle. For example, balancing system 320 may determine whether the number of items is too low to create one of each type of bundles. If balancing system 320 determines that there is insufficient inventory for each bundle (step 1312: Yes), balancing system 320 may continue to step 1314 and apply a predictive algorithm to prioritize frequently requested bundles, even if some bundles end up being OOS. In such embodiments, prioritized bundles may get assigned items first, before non-prioritized bundles, to guarantee that the prioritized bundles have sufficient inventory to achieve a target number of bundles. For example, prioritized bundles may get filled or completed first, and only remaining items (which are not assigned to prioritized bundles) get assigned to non-prioritized bundles. Additionally, or alternatively, in step 1314 balancing system 320 may employ ML models to forecast demand and allocate available items to virtual bundles with higher demand. However, if balancing system 320 determines that there is sufficient inventory for each bundle (step 1312: No), balancing system 320 may continue to step 1316 and assign inventory to the virtual bundles and update a database, such as balancing database 324, with the updated distribution of virtual bundles.

In step 1318, balancing system 320 may determine whether there is excess inventory after the assignment of step 1316. For example, balancing system 320 may determine whether there are loose item units after all bundles are guaranteed to have at least the threshold quantity. If balancing system 320 determines that there is no excess inventory after assignment (step 1318: No) the sequential rebalancing process is terminated and balancing system 320 may continue to step 1330 and notify of changes to the seller portal. However, if balancing system 320 determines that there is excess inventory after assignment (step 1318: Yes), balancing system 320 may continue to step 1320.

In step 1320, balancing system 320 may determine whether a priority model for virtual bundle assignment is available. For example, balancing system 320 may determine whether an ML model is available to forecast demand and give priority to certain virtual bundles. If balancing system 320 determines that there are priority models available (step 1320: Yes), balancing system 320 may continue to step 1322 and assign excess inventory based on priority rules. However, if balancing system 320 determines that there are no priority models available (step 1320: No), balancing system 320 may continue to step 1324 and sequentially assign items from highest to lowest grouping numbers to provide additional items to as many virtual bundles as possible. After steps 1322 or 1324, balancing system 320 may continue to step 1330 and notify changes to seller portals.

Figure 14:
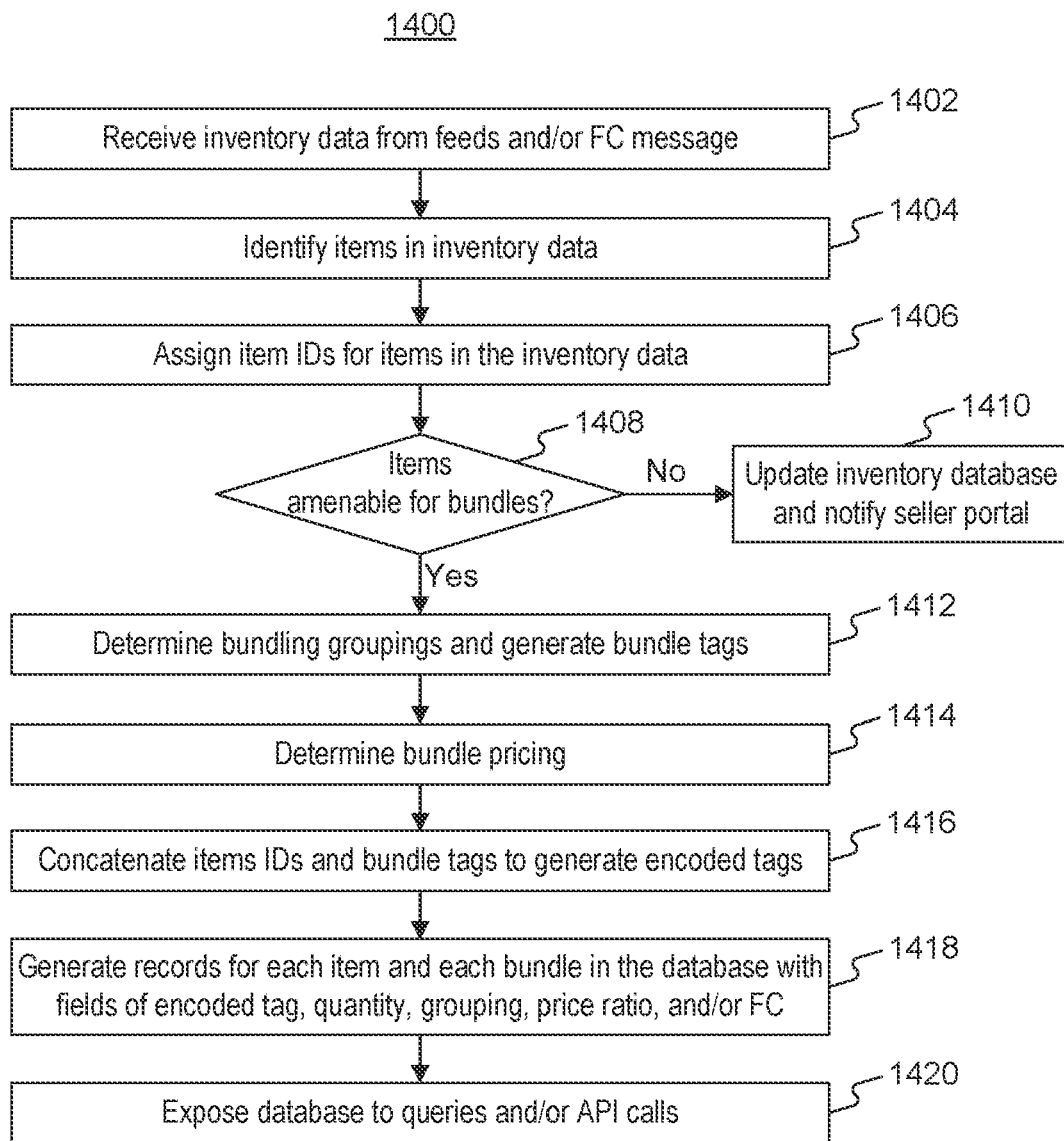
FIG. 14 is a flow chart of an exemplary process for populating and exposing databases with bundle information, consistent with disclosed embodiments.

FIG. 14 is a flow chart of an exemplary process 1400 for populating and exposing databases with virtual bundle information, consistent with disclosed embodiments. In some embodiments, elements of system 300 may perform process 1400. For example, as disclosed in the steps description below, balancing system 320 may perform process 1400. Alternatively, or additionally, other elements of system 300 may perform one or more steps of process 1400. For example, databases 380, client devices 350, or online resources 340 may perform process 1400, or parts of process 1400. Further, in some embodiments systems 800 and 900, or parts thereof, may perform process 1300. For instance, bundling system 908 may perform process 1400.

In step 1402, balancing system 320 may receive inventory data feeds and/or FC messages. For example, balancing system 320 may receive inventory data feeds from FC/Warehouse systems 310. In some embodiments, as discussed in connection with FIGS. 8 and 9, balancing system 320 may receive an FC inventory feed, such as FC inventory feed 822 (FIG. 8), indicating items available at the FC. For example, in some embodiments balancing system 320 may connect with inventory systems of FCs in step 1402 to receive inventory information. In some embodiments, step 1402 may be configured to be periodic, and balancing system 320 may receive inventory data feeds once every minute, every 15 minutes, every hour, every day, and/or another predetermined frequency. In some embodiments, the inventory data feed is a real time data feed coupled to inventory systems of the at least one fulfillment center and they include at least one of a scan code system, an imaging inventory system, or a wireless tag systems, as further discussed in connection with FIG. 2.

In some embodiments, balancing system 320 may receive inventory feeds as snapshot inventory, adjustment inventory, or a combination of snapshot and adjustment inventory. Snapshot inventory may specify inventory levels as of a particular time. For example, snapshot inventory may reflect inventory counts as of a specific time in which the system time as well. FC/Warehouse systems 310 may provide the inventory count at a time based on transactions registered during a previous time period and/or according to inventory management systems, such as those that include sensors 217 (FIG. 2). Thus, snapshot inventory may provide a real time status of the inventory in an FC. In some embodiments. FC/Warehouse systems 310 may be configured to transmit snapshot inventories with certain periodicity (e.g., every day, every hour, every 15 min, or every minute). The adjustment inventory may specify differences in inventory based on orders, purchases, and/or predictive algorithms. Adjustment inventory may adjust quantities available in FC/Warehouse systems 310. The adjustments may update inventories when performing an unplanned physical inventory count and reporting it after the fact, in order to ensure that inventory is up-to-date. The adjustment inventory may be performed during daily business and be performed with certain periodicity. However, the adjustment inventory may also be unpredictable and based on interruptions or other operations (e.g., purchase orders). Thus, unlike snapshot inventory, adjustment inventory may be provided to data feeds from FC/Warehouse systems 310 to balancing systems 320 unpredictably throughout the day. Hence, in step 1402 balancing system 320 may receive snapshot inventory, adjustment inventory, or a combination of both, through the data feeds and communications. These updated may be periodic or sporadic between balancing system 320 and FC/Warehouse systems 310.

In step 1404, balancing system 320 may identify items in inventory data. For example, balancing system 320 may interpret codes associated with items as received in step 1402. In step 1406, balancing system 320 may assign item IDs for items in the inventory data. For example, balancing system 320 may generate an item ID and generate a row in table 1200 (FIG. 12) that identifies an item, the item category, and other data fields. Further, in step 1406 balancing system 320 may employ encoder 648 (FIG. 6) to generate an item code, such as "ITEM123."

In step 1408, balancing system 320 may determine whether one or more of the items received in step 1404 and identified in step 1406 is amenable for bundling. Some items are not amenable for bundles, either because customers do not buy them in bundles or because selling them in bundles do not represent any differential pricing. In step 1408, balancing system 320 may determine whether at least some of the items available in the FC can be bundled. If balancing system 320 determines that none of the items can be bundled (step 1408: No), balancing system 320 may continue to step 1410 and update inventory databases (e.g., update balancing database 324) and notify a seller portal so the seller portal does not offer bundled products. However, if balancing system 320 determines that one or more of the items can be bundled (step 1408: Yes), balancing system 320 may continue to step 1412.

In step 1412, balancing system 320 may determine bundling groupings generate bundle tags. For example, balancing system 320 may determine how many virtual bundles can be created for the items received in the inventory and their associated grouping number or bundle quantity. Further in step 1412 balancing system 320 may determine a bundle tag, such as "VB-2," as described in connection with FIG. 10. In step 1414, balancing system 320 may determine bundle pricing. For example, balancing system 320 may use forecast demand data and/or marketing campaigns to assign bundle and item pricing for the virtual bundles determined in step 1412.

In step 1416, balancing system 320 may concatenate item IDs (determined in step 1406) and encoded tags (determined in step 1412) to generate a complete item and bundle identity that identifies the virtual bundle item, grouping quantity, and pricing. For example, encoder 648 (FIG. 6) may use assigned IDs and virtual bundles groupings or pricing to generate a concatenated item ID that provides information to identify virtual bundles in balancing database 324. Thus, in step 1416 balancing system 320 may generate a plurality of encoded tags, each of the encoded tags encoding an item ID and a bundle group, and generate a record in the database for each item in the inventory data and each of the plurality of bundles, each data record comprising an encoded tag field and a quantity field.

In step 1418, balancing system 320 may generate records for each item and each bundle in the database with fields of encoded tag, quantity, grouping, price ratio, and/or FC. For example, balancing system 320 may generate records for each one of the virtual bundles as described in connection with FIG. 10. For example, in step 1418 balancing system 320 may generate records of the plurality of bundles that associate bundles of higher grouping are associated with a lower per item price than virtual bundles of lower grouping. In step 1420, balancing system 320 may expose the database to queries and/or API calls. For example, balancing system 320 may expose records generated in step 1418 to REST API calls from seller portals to provide information required for generating websites with listings of virtual bundles and multiple variations and pricing for available items.

Figure 15:
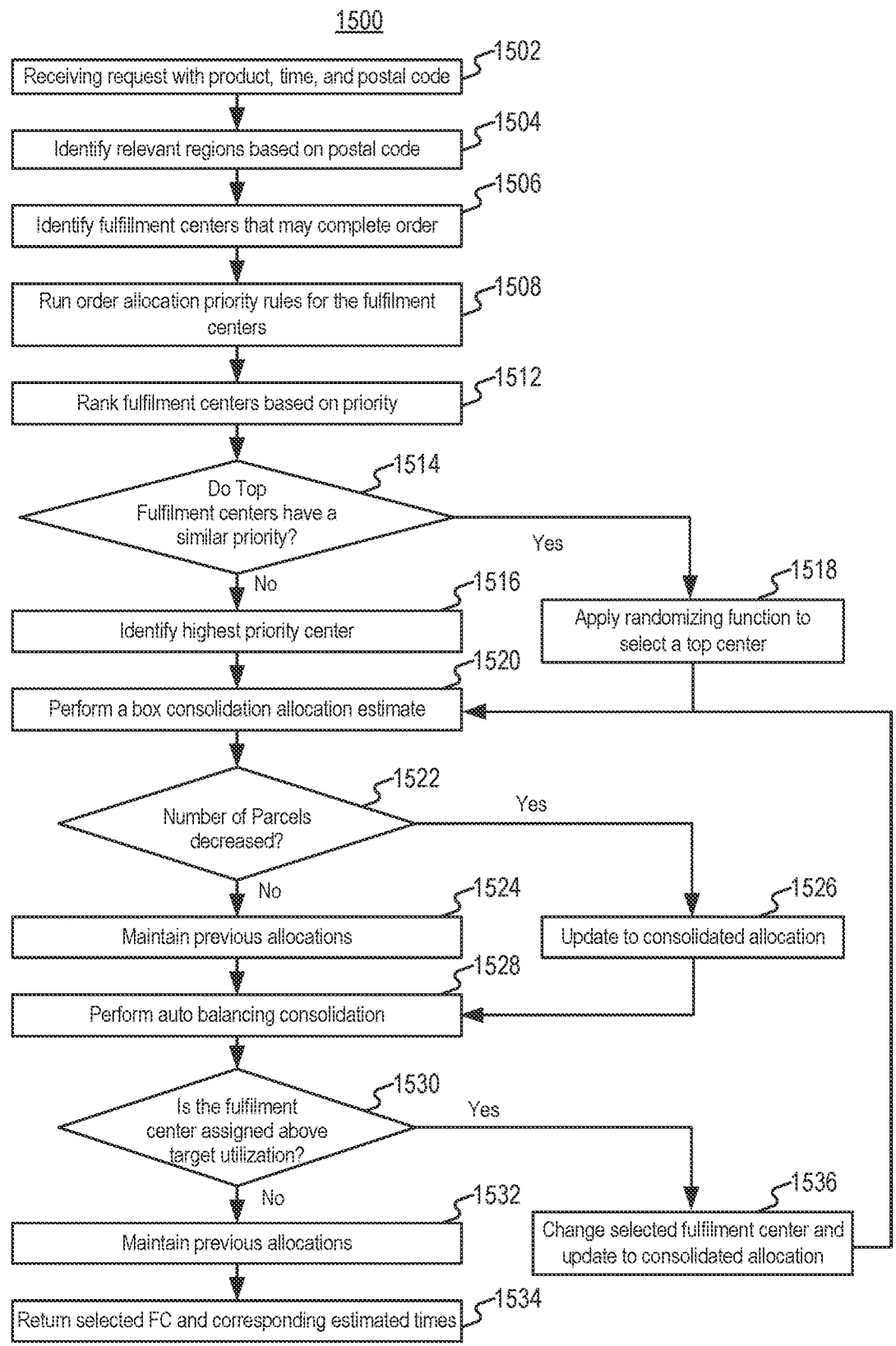
FIG. 15 is a flow chart of an exemplary process for assignment of fulfillment centers and determining a promised delivery date (PDD), consistent with disclosed embodiments.

FIG. 15 is a flow chart of an exemplary process 1500 for assignment of fulfillment centers, consistent with disclosed embodiments. In some embodiments, elements of system 300 may perform process 1500. For example, as disclosed in the steps description below, balancing system 320 may perform process 1500. In particular, FC identifier 644 (FIG. 6) may perform process 1500. Alternatively, or additionally, other elements of system 300 may perform one or more steps of process 1500. For example, databases 380, client devices 350, or online resources 340 may perform process 1500, or parts of process 1500. Further, in some embodiments systems 800 and 900, or parts thereof, may perform process 1500. For instance, bundling system 908 may perform process 1500.

In step 1502, balancing system 320 may receive a request for fulfilling a client order. The request may include product, time, and postal code information. Based on the information in the request, balancing system 320 may identify relevant geographical regions in step 1504. For example, Balancing system 320 may identify regions that may fulfill a potential order for the product based on the customer's postal code. In step 1506, balancing system 320 may identify FCs that may complete a potential order for the product or for the selected bundle.

In step 1508, balancing system 320 may run order allocation priority rules for the FCs. In some embodiments, the allocation priority rules may be stored in memory devices within balancing system 320, which may retrieve allocation rules specific for the identified region(s) in step 1504. Alternatively, or additionally, the allocation priority rules may be stored in database 380, and balancing system 320 may query the data base once FCs have been identified in step 1506.

The order allocation rules may generate a priority score for each FC in the region. The priority allocation rules may include several rules with different preferences. For example, the order allocation rules may include a rule for delivery carrier that has a preference for specific carriers. Further, the order allocation rules may include an estimated delivery and diversity of virtual bundles. Further, based on historic trends and an association of the product and each FC, the allocation rules may estimate a tentative demand and give preference to FCs with lower demands.

With the considerations of allocation rules, balancing system 320 may rank FCs based on the calculated priority in step 1512. For example, all the FCs in the region may be assigned a priority score and the FCs may be ranked based on the priority score.

In step 1514, balancing system 320 may determine whether top FCs have a similar priority. For example, balancing system 320 may determine whether priority scores of FCs are within a threshold. If the top FCs do not have a similar priority (step 1514: No), balancing system 320 may continue to step 1516 and identify FC with the highest priority. However, if the top FCs have a similar priority (step 1514: yes), balancing system 320 may continue to step 1518 and apply a randomizer function to select a top FC.

In step 1520, balancing system 320 may perform a box consolidation allocation estimate. With the selected FCs, balancing system 320 may determine costs of shipment from the FCs, including the number of boxes that would be used for shipping. In step 1522, balancing system 320 may determine whether the number of parcel or boxes decreased with the box consolidation. If the number of parcels does not decrease (step 922: No), balancing system 320 may continue to step 1524 and maintain the previous allocations. However, if the number of parcels decreases after the box consolidation (step 1522: Yes), balancing system 320 may continue to step 1526 and update the allocation to the consolidated allocation.

In step 1528, balancing system 320 may perform an auto balancing consolidation. The auto balancing consideration may attempt to balance the load in different FCs of the region identified in step 1504. With the goal of avoiding overburdening a specific center, balancing system 320 may perform an auto balancing that attempts to improve utilization of resources in different FCs.

In step 1530, based on the auto balancing consolidation, balancing system 320 may determine whether the FC that was assigned, in steps 1516 or 1518, is above a target utilization. If balancing system 320 determines the FC is not above the target utilization (step 1530: no), balancing system 320 may continue to step 1532 and maintain the previous allocation. However, if balancing system 320 determines the FC is above the target utilization (step 1530: yes), balancing system 320 may continue to step 1536 and change the selected FC to avoid overburdening the selected FC. In some embodiments of process 1500, balancing system 320 may return to step 1520 after step 1536 to re-run the box and auto balancing consolidations for the newly selected FC.

In step 1534, balancing system 320 may transmit the selected FC and corresponding estimated times to the requester of step 1502 and/or to a database, such as balancing database 324, to request order fulfillment and update estimated inventory.

Figure 16:
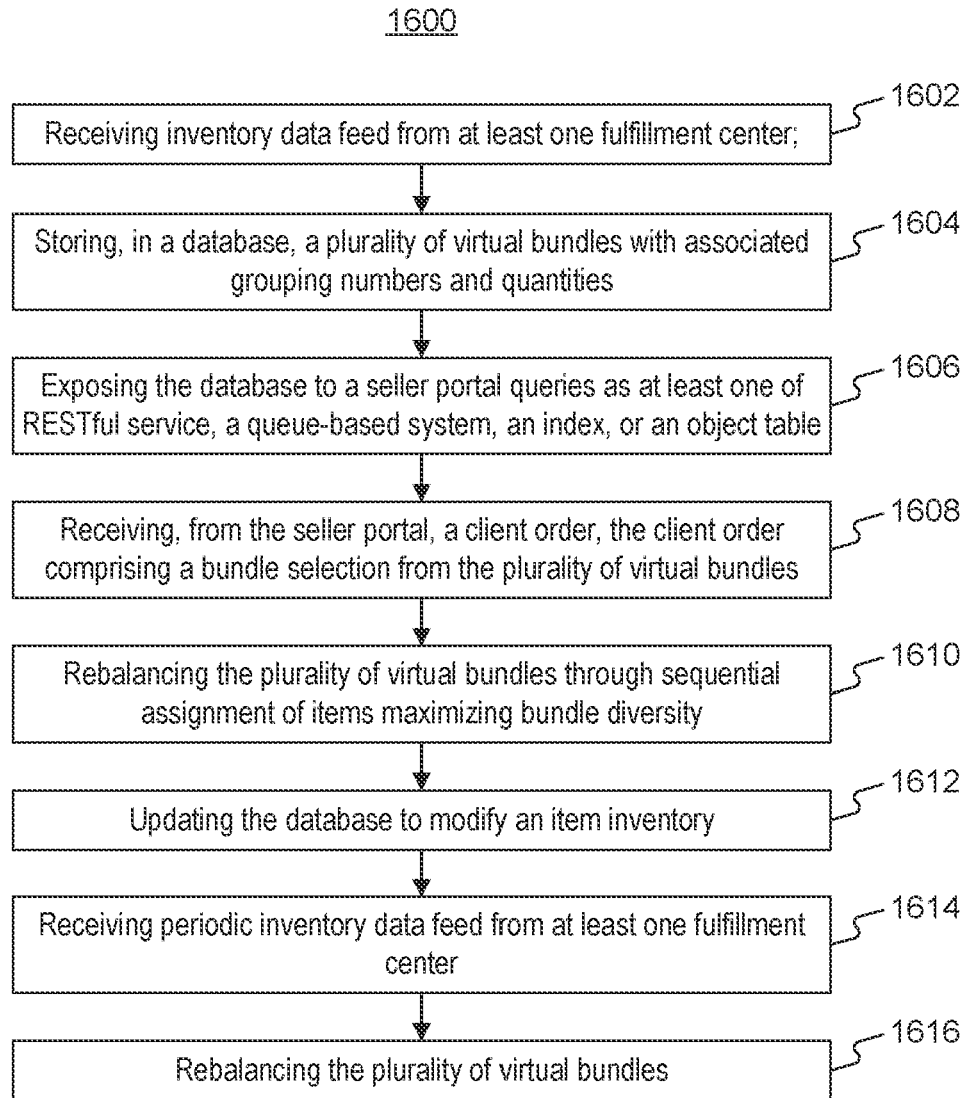
FIG. 16 is a flow chart of an exemplary process for dynamically rebalancing virtual bundle inventory, consistent with disclosed embodiments.

FIG. 16 is a flow chart of an exemplary process 1600 for dynamically rebalancing virtual bundle inventory, consistent with disclosed embodiments. In some embodiments, elements of system 300 may perform process 160. For example, as disclosed in the steps description below, balancing system 320 may perform process 160. Alternatively, or additionally, other elements of system 300 may perform one or more steps of process 160. For example, databases 380, client devices 350, or online resources 340 may perform process 160, or parts of process 160. Further, in some embodiments systems 800 and 900, or parts thereof, may perform process 160. For instance, bundling system 908 may perform process 1600.

In step 1602, balancing system 320 may receive inventory data from at least one fulfillment center. For example, balancing system 320 may receive inventory data from FC/warehouse system 310. In some embodiments, the inventory data reflects a physical quantity of items in the at least one fulfillment center. In step 1604, balancing system 320 may store, in a database, a plurality of virtual bundles associated with grouping numbers and quantities. For example, as further described in connection with FIG. 10, balancing system 320 may generate a plurality of virtual bundles for different items, specifying grouping number, available quantity of bundles (i.e., number of available bundles), and bundle price. The virtual bundles may be stored in databases, such as database 380, and/or in data structures such as table 1200 (FIG. 12). In some embodiments, in step 1604 balancing system 320 may create at least two bundles for each item in the inventory data.

In step 1606, balancing system 320 may expose the database to a seller portal queries as at least one of RESTful service, a queue-based system, an index, or an object table. For example, balancing system 320 may expose REST API for services such as (1) monitoring event virtual bundles, (2) updating virtual bundles, and (3) providing inventory data including available bundles. In such embodiments, balancing database 324 may store instructions to issue GET, PUT, DELETE, or POST instructions to request or send information to and from balancing system 320 using the exposed API services. Alternatively, or additionally, in step 1606 balancing system 320 may open queries to databases and/or memory devices storing real-time inventory and bundle information.

In step 1608, balancing system 320 may receive, from a seller portal, a client order. The client order may include a bundle selection from the plurality of virtual bundles. For example, one of seller portals 702 (FIG. 7) or external front end system 103 (FIG. 1A) may receive client orders that are relayed to balancing system 320 as discussed in connection with FIGS. 7 and 11. In some embodiments, the order may include one or more of first order 958 or second order 956 (FIG. 9).

In step 1610, balancing system 320 may rebalance the plurality of virtual bundles through sequential assignment of items maximizing bundle diversity. For example, as further discussed in connection with FIGS. 10 and 13, balancing system 320 may rebalance the available inventory in the plurality of virtual bundles based on rules to maximize bundle diversity (i.e., having the greatest number of options for bundled listings) or based on forecasted data. In some embodiments, step 1610 may include updating the plurality of virtual bundles by aggregating inventories associated with the plurality of virtual bundles and rebalancing the plurality of virtual bundles based on the aggregated inventories.

In step 1612, balancing system 320 may update the database to modify an item inventory. For example, as discussed in connection with FIG. 10, balancing system 320 may modify the grouping numbers in the virtual bundles to reflect a lower inventory. Further, in step 1612 balancing system 320 may also modify pricing of virtual bundles based on forecast data or marketing campaigns.

In step 1614, balancing system 320 may receive periodic inventory data from at least one FC. For instance, as discussed in connection with FIG. 11, balancing system 320 may receive inventory updates from FC/Warehouse systems 310 periodically including updates about available inventory at the FC or warehouse. In step 1616, balancing system 320 may rebalance the plurality of virtual bundles based on the information received from the FC. As discussed in connection with FIG. 11, in some embodiments the update data may override estimated information.

Figure 17:
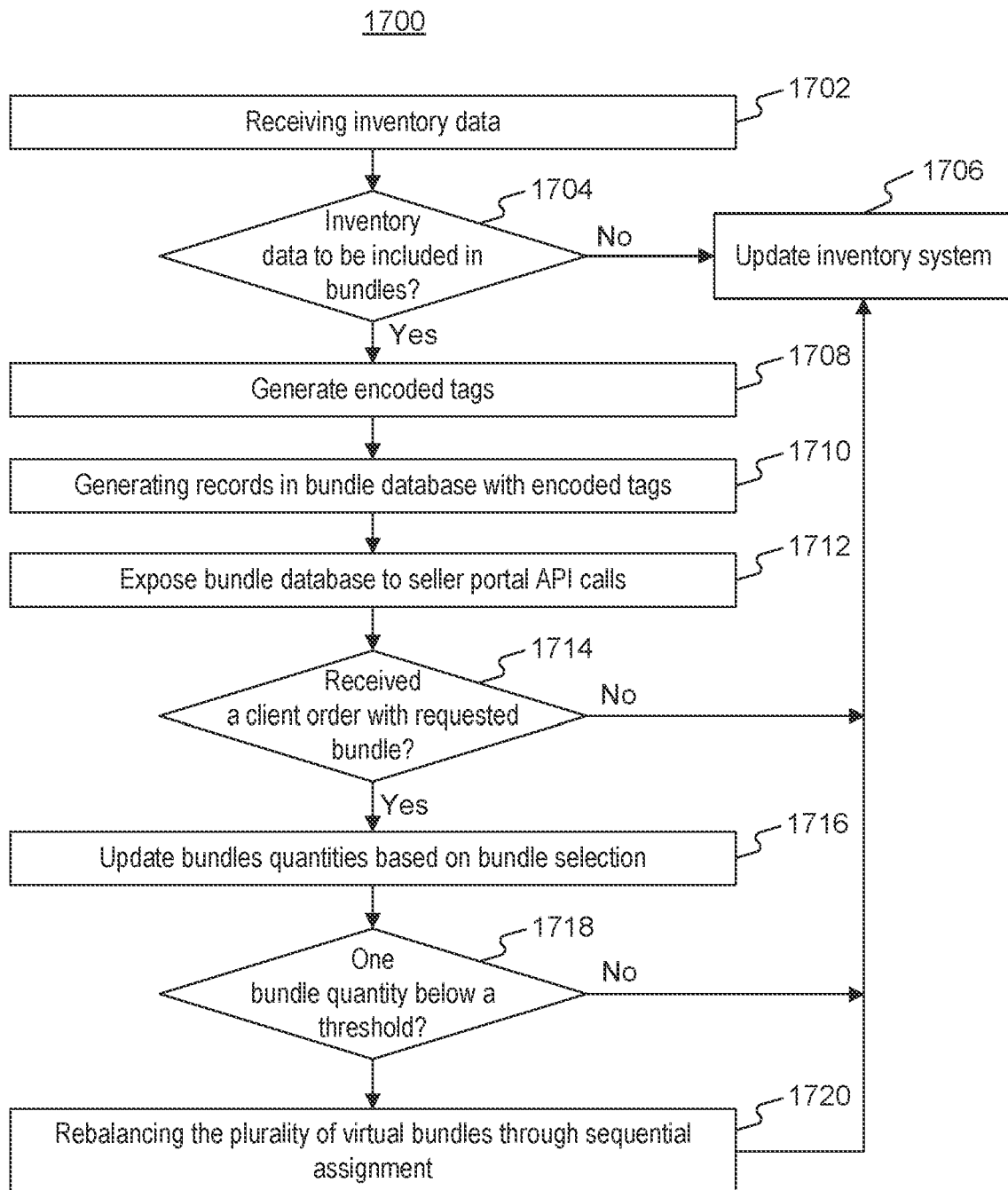
FIG. 17 is a flow chart of an exemplary process for dynamically rebalancing virtual bundles in response to client orders, consistent with disclosed embodiments.

FIG. 17 is a flow chart of an exemplary process 1700 for dynamically rebalancing virtual bundles in response to client orders, consistent with disclosed embodiments. In some embodiments, elements of system 300 may perform process 1700. For example, as disclosed in the steps description below, balancing system 320 may perform process 1700. Alternatively, or additionally, other elements of system 300 may perform one or more steps of process 1700. For example, databases 380, client devices 350, or online resources 340 may perform process 1700, or parts of process 1700. Further, in some embodiments systems 800 and 900, or parts thereof, may perform process 1700. For instance, bundling system 908 may perform process 1700.

In step 1702, balancing system 320 may receive inventory data. For example, balancing system 320 may receive inventory data from FCs or warehouses in system 300. In step 1704, balancing system 320 may determine whether received inventory is to be included or grouped in virtual bundles. If balancing system 320 determines that the received inventory is not to be organized in bundles (step 1704: No), balancing system 320 may continue to step 1706 and update inventory or bundling systems, such as bundling system 908 (FIG. 9). However, if balancing system 320 determines that the received inventory can be organized in bundles (step 1704: Yes), balancing system 320 may continue to step 1708.

In step 1708, balancing system 320 may generate encoded tags. For example, as further described in connection with FIG. 14, encoder 648 may generate tags by encoding item identifiers, bundle identifies, and grouping numbers. In step 1710, balancing system 320 may generate records in bundle database with the encoded tags. For example, balancing system 320 may populate databases or data structures, like table 1200 (FIG. 12), with identifiers for virtual bundles based on encoded tags. In step 1712, balancing system 320 may expose the virtual bundle information of bundle database to seller portal API calls. For example, balancing system 320 may expose balancing database 324 to calls from seller portal 109 (FIG. 1A).

In step 1714, balancing system 320 may determine whether it has received a client order with a requested bundle. For example, through global inventory systems, balancing system 320 may receive client requests. In step 1714 balancing system 320 may determine whether there is a client request for one or more of the bundles exposed in step 1712. If balancing system 320 determines that it has not received a client order with requested bundle (step 1714: No), balancing system 320 may continue to step 1706 and update the inventory system. But, if balancing system 320 determines that it has received a client order with requested bundle (step 1714: Yes), balancing system 320 may continue to step 1716 and update bundle quantities based on the bundle selection. For example, balancing system 320 may perform operation 1000 (FIG. 10) to rebalance virtual bundles based on the client request.

In step 1718, balancing system 320 may determine whether one bundle quantity is below a threshold. For example, balancing system 320 may evaluate whether the rebalancing process leaves one or more virtual bundles with low quantities below thresholds. This low quantity bundles may be undesirable because they could result in false OOS notices. If in step 1718 balancing system 320 determines that one bundle quantity is below a threshold (step 1718: Yes), balancing system 320 may continue to step 1720 and rebalance the plurality of bundles through sequential assignment to rearrange available inventory maximizing bundle diversity. However, if in step 1718 balancing system 320 determines that none of the bundle quantities is below a threshold (step 1718: No), balancing system 320 may continue to step 1706 and update inventory system.

Figure 18:
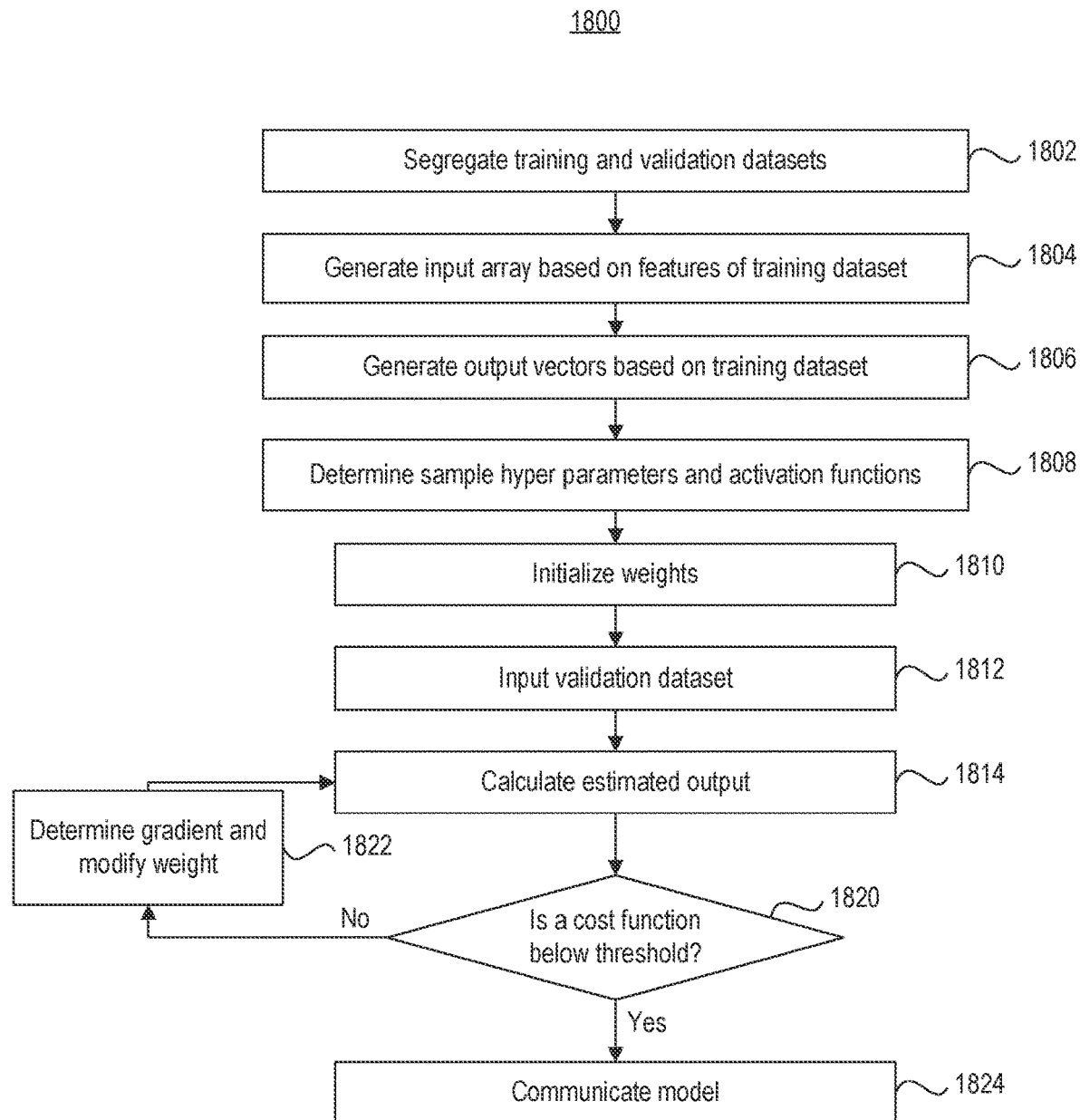
FIG. 18 is a flow chart illustrating an exemplary process for generating a machine-learning predictive model, in accordance with disclosed embodiments FIG. 19 are front views of a sequence of Single Display Page exemplary graphical user interfaces in a mobile device, consistent with disclosed embodiments.

FIG. 18 is a flow chart illustrating an exemplary process 1800 for generating a machine-learning predictive models, in accordance with disclosed embodiments. In some embodiments, elements of system 300 may perform process 1800. For example, as disclosed in the steps description below, balancing system 320 may perform process 1800. In particular, balancing module 646 (FIG. 6) may perform process 1800. Alternatively, or additionally, other elements of system 300 may perform one or more steps of process 1800. For example, databases 380, client devices 350, or online resources 340 may perform process 1800, or parts of process 1800. Further, in some embodiments systems 800 and 900, or parts thereof, may perform process 1800. For instance, bundling system 908 may perform process 1800.

In step 1802, balancing system 320 may determine a training dataset and a validation dataset. For example, balancing system 320 may partition virtual bundle purchases collected bundle records 606 (FIG. 6) in training and a validation portions. Balancing system 320 may receive data past purchases, past inventory availability, and/or virtual bundle pricing. In some embodiments, the virtual bundle information may include metadata describing attributes of the record and an associated property. Balancing system 320 may divide the records and generate two groups, one to train machine-learning model and a second to validate the model.

In step 1804, balancing system 320 may generate an input array based on features of the training dataset. For example, balancing system 320 may generate a variable including estimated demand, periodicity of demand, and pricing elasticity for virtual bundles.

In step 1806, balancing system 320 may generate output vectors based on metadata of the training dataset. For example, based on the recorded data for virtual bundle purchases in the training dataset, the balancing system 320 may generate a desired output vector making a prediction of, for example, forecasted demand for bundled items.

In step 1808, balancing system 320 may determine sample hyper-parameters and activation functions to initialize the model to be created. For example, balancing system 320 may select initial hyper-parameters such as a number of layers and nodes, and determine whether the network will be fully or partially connected. In addition, in step 1808 balancing system 320 may determine the dimensionality of the network and/or determine stacks of receptive field networks. Moreover, in step 1808 balancing system 320 may also associate the model with one or more activation functions. For example, balancing system 320 may associate the model with one or more sigmoidal functions. In step 1810, balancing system 320 may initialize weights for synapsis in the network.

In step 1812, balancing system 320 may input a validation dataset in the model. For example, balancing system 320 may apply the input array based on features of training dataset of step 1804 to calculate an estimated output and a cost function in step 1814. In step 1820, balancing system 320 may determine whether the cost function is below a threshold of required accuracy, which may be specified by an administrator of balancing system 320. If balancing system 320 determines that the cost function is not below a threshold and the required accuracy has not being achieved, balancing system 320 may continue to step 1822 and modify model parameters. For example, when generating a neural network, in step 1822, balancing system 320 may determine a gradient to modify weights in synapses or modify the activation functions in the different nodes. However, if the cost function if below a threshold (step 1820: Yes), balancing system 320 may accept and communicate the model in step 1824.

Figure 19:
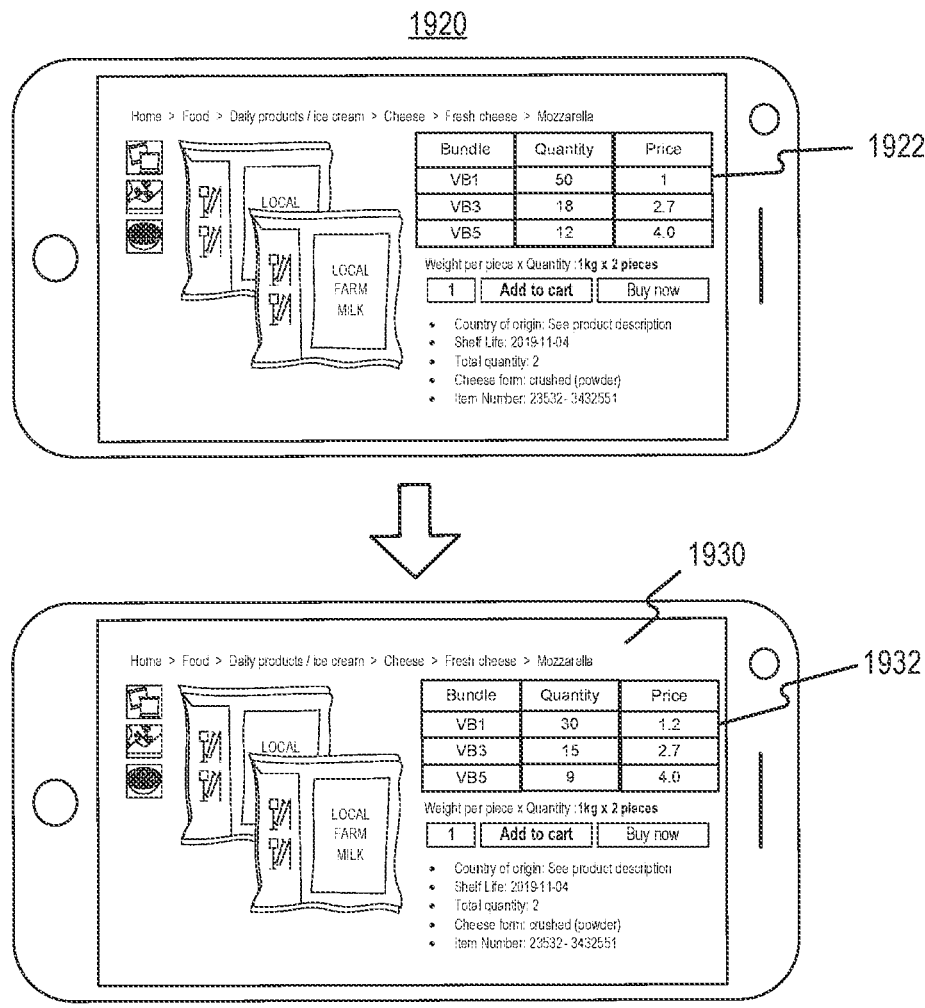

FIG. 19 are front views of a sequence of Single Display Page exemplary graphical user interfaces in a mobile device, consistent with disclosed embodiments. FIG. 19 shows a first GUI 1920 that may be displayed in client devices 350 (FIG. 3) before a rebalancing operation. For example, GUI 1920 may be displayed in a client device when the client device browses a seller portal looking for products. As shown in FIG. 19, GUI 1920 includes a table 1922 showing different bundles for the item shown in the single display page. For example, single display page may show an item A. The seller portal may offer multiple bundles for item A including a bundles grouping 1, 3, and 5, of item A (e.g., encoded VB1, VB3, and VB5). The table 1922 may also specify the quantity of available bundles and a bundle price.

FIG. 19 also shows a second GUI 1930. GUI 1930 may display the same single display page as GUI 1920. However, GUI 1930 may have an updated table 1932. For example, GUI 1930 when a customer makes an order of bundled items. As described above in connection with FIG. 11, that client order triggers a series of communications between FCs, seller portals, and balancing systems that result in a rebalancing process used to update the available inventory and available bundles. Thus, table 1932 may display a modified quantity of the virtual bundles. In some embodiments, GUI 1930 may also display modified pricing to reflect demand forecasts and/or marketing campaigns.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic. C, etc.). Java. C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system comprising:
one or more processors;
one or more databases; and
one or more memory devices storing instructions that, when executed by the one or more processors, configure the one or more processors to:
expose the one or more databases to queries from a seller portal through at least one of a RESTful service, a queue based system, an index, or an object table, the one or more databases storing a plurality of virtual bundles comprising item bundles grouping two or more items;
receive updated inventory data from a global inventory system that is coupled to a plurality of fulfillment centers;
rebalance the plurality of virtual bundles based on the updated inventory data; and
in response to updating the plurality of virtual bundles, notifying the seller portal of changes in the one or more databases,
wherein the updated inventory data overrides quantities associated with the plurality of virtual bundles stored in the one or more databases.

2. The system of claim 1, wherein the one or more databases is exposed to queries from the seller portal through the RESTful service.

3. The system of claim 1, wherein the updated inventory data comprises data sourced from one or more warehouse-item management systems.

4. The system of claim 1, wherein the instructions further configure the one or more processors to:
receive, from the seller portal, a client order comprising a bundle selection from the plurality of virtual bundles;
rebalance the plurality of virtual bundles through sequential assignment of items and by decreasing a quantity of at least one of the plurality of virtual bundles based on the bundle selection; and
update the one or more databases to store the rebalanced plurality of virtual bundles.

5. The system of claim 4, wherein the instructions further configure the one or more processors to:
- determine whether the quantity falls below a threshold; and
- in response to determining the quantity falls below the threshold, issue API calls to the seller portal and the global inventory system specifying changes in the one or more databases.

6. The system of claim 1, wherein the one or more processors is configured to rebalance the plurality of virtual bundles by aggregating inventories of the plurality of fulfillment centers and rebalancing the plurality of virtual bundles based on the aggregated inventories.

7. The system of claim 1, wherein the one or more databases store at least one of an item type, a grouping number, a quantity of available bundles, or a bundle price for each one of the plurality of virtual bundles.

8. The system of claim 1, wherein the plurality of virtual bundles includes two or more of the same item.

9. The system of claim 1, wherein the one or more processors is configured to rebalance the plurality of virtual bundles by applying a predictive model to:
- identify prioritized bundles from the plurality of virtual bundles, and
- allocate a greater number of items to the prioritized bundles, the predictive model comprising a regression model trained with bundle selections collected from the seller portal, and partitioned in a training portion and a validation portion.

10. The system of claim 1, wherein:
- the global inventory system is configured to be coupled to a plurality of third party systems; and
- the one or more processors is configured to rebalance the plurality of virtual bundles by mingling items from the plurality of fulfilment centers and the third party systems.

11. A computer-implemented method comprising:
- exposing one or more databases to queries from a seller portal through at least one of a RESTful service, a queue based system, an index, or an object table, the one or more databases storing a plurality of virtual bundles comprising item bundles grouping two or more items;
- receiving updated inventory data from a global inventory system that is coupled to a plurality of fulfillment centers;
- rebalancing the plurality of virtual bundles based on the updated inventory data; and
- after updating the plurality of virtual bundles, notifying the seller portal of changes in the one or more databases,
- wherein the updated inventory data overrides quantities associated with the plurality of virtual bundles stored in the one or more databases.

12. The method of claim 11, wherein the one or more databases is exposed to queries from the seller portal through the RESTful service.

13. The method of claim 11, wherein the updated inventory data comprises data sourced from one or more warehouse-item management systems.

14. The method of claim 11 further comprising:
- receiving, from the seller portal, a client order comprising a bundle selection from the plurality of virtual bundles;
- rebalancing the plurality of virtual bundles through sequential assignment of items and by decreasing a quantity of at least one of the plurality of virtual bundles based on the bundle selection; and
- updating the one or more databases to store the rebalanced plurality of virtual bundles.

15. The method of claim 14, further comprising:
- determining whether the quantity falls below a threshold; and
- in response to determining the quantity falls below the threshold, issuing API calls to the seller portal and the global inventory system specifying changes in the one of more databases.

16. The method of claim 11, wherein rebalancing the plurality of virtual bundles comprises aggregating inventories of the plurality of fulfillment centers and rebalancing the plurality of virtual bundles based on the aggregated inventories.

17. The method of claim 11, wherein the one or more databases stores an item type, a grouping number, a quantity of available bundles, and a bundle price for each one of the plurality of virtual bundles.

18. The method of claim 11, wherein:
- the plurality of virtual bundles includes two or more of the same item; and
- rebalancing the plurality of virtual bundles comprises applying a predictive model to identify prioritized bundles from the plurality of virtual bundles and allocate a greater number of items to the prioritized bundles, the predictive model comprising a regression model trained with bundle selections, collected from the seller portal, partitioned in a training portion and a validation portion.

19. The method of claim 11, wherein:
- the global inventory system is configured to be coupled to a plurality of third party systems; and
- rebalancing the plurality of virtual bundles comprises mingling items from the plurality of fulfilment centers and the third party systems.

20. A non-transitory computer readable medium storing instructions that, when executed by at least one processor, configure the at least one processor to perform operations comprising:
- exposing one or more databases to queries from a seller portal through at least one of a RESTful service, a queue based system, an index, or an object table, the one or more databases storing a plurality of virtual bundles comprising item bundles grouping two or more items;
- receiving updated inventory data from a global inventory system that is coupled to a plurality of fulfillment centers;
- rebalancing the plurality of virtual bundles based on the updated inventory data; and
- after updating the plurality of virtual bundles, notifying the seller portal of changes in the one or more databases,
- wherein the updated inventory data overrides quantities associated with the plurality of virtual bundles stored in the one or more databases.

* * * * *